United States Patent
Aldrich

(10) Patent No.: US 9,162,705 B2
(45) Date of Patent: Oct. 20, 2015

(54) ADJUSTABLE RIDE HEIGHT, VEHICLE, SYSTEM AND KIT

(71) Applicant: Aaron L. Aldrich, Clifton Park, NY (US)

(72) Inventor: Aaron L. Aldrich, Clifton Park, NY (US)

(*) Notice: Subject to any disclaimer, the term of this patent is extended or adjusted under 35 U.S.C. 154(b) by 0 days.

(21) Appl. No.: 14/230,718

(22) Filed: Mar. 31, 2014

(65) Prior Publication Data

US 2014/0306414 A1    Oct. 16, 2014

Related U.S. Application Data

(60) Provisional application No. 61/810,477, filed on Apr. 10, 2013.

(51) Int. Cl.
| | |
|---|---|
| *B62D 7/20* | (2006.01) |
| *B60G 15/06* | (2006.01) |
| *B60G 9/02* | (2006.01) |
| *B60G 9/00* | (2006.01) |

(52) U.S. Cl.
CPC .. *B62D 7/20* (2013.01); *B60G 9/00* (2013.01); *B60G 9/022* (2013.01); *B60G 15/067* (2013.01); *B60G 2200/314* (2013.01); *B60G 2200/341* (2013.01); *B60G 2204/128* (2013.01); *B60G 2204/43* (2013.01)

(58) Field of Classification Search
CPC ............ B62D 7/16; B62D 7/163; B62D 7/20; B60G 3/185; B60G 9/00; B60G 15/067; B60G 15/068; B60G 2200/341; B60G 2206/111; B60G 2500/30; B60G 9/022; B60G 2204/43; B60G 2200/314

USPC .......... 280/5.507, 5.508, 5.513, 5.514, 6.157, 280/788, 124.106, 124.107, 124.11, 280/124.116, 124.128, 124.153–124.155, 280/93.502, 93.507, 93.508, 93.51, 93.511, 280/86.5, 124.147; 180/209

See application file for complete search history.

(56) References Cited

U.S. PATENT DOCUMENTS

| | | | | |
|---|---|---|---|---|
| 1,984,565 | A | * 12/1934 | Bell | .............................. 267/204 |
| 2,146,418 | A | 2/1939 | Judson | |
| 2,621,920 | A | * 12/1952 | Hogsten et al. | .................. 267/44 |
| 2,712,946 | A | * 7/1955 | Cicero | ....................... 280/6.159 |
| 3,002,762 | A | 10/1961 | Scheel | |
| 3,097,839 | A | 7/1963 | Hirst et al. | |
| 3,118,687 | A | * 1/1964 | Forbush | ................. 280/124.136 |
| 3,229,992 | A | * 1/1966 | Traywick | ................... 280/5.522 |

(Continued)

FOREIGN PATENT DOCUMENTS

| | | |
|---|---|---|
| DE | 4216542 A1 | 12/1992 |
| DE | 19528565 A1 | 2/1996 |

(Continued)

*Primary Examiner* — Laura Freedman
(74) *Attorney, Agent, or Firm* — Schmeiser, Olsen & Watts, LLP

(57) ABSTRACT

Disclosed herein is an adjustable suspension mount system that includes a first mount link pivotally attached to a mount feature and extending to a device used to support a load on a first wheel, the first mount link pivotally attached to the device. The mount feature is attached to or integrated into the frame of the vehicle. The system further includes a second mount link pivotally attached to at least one of the mount feature and a second mount feature, the second mount link extending to the first mount link, the second mount link pivotally attached to the first mount link. Further disclosed is a vehicle including the system, and a kit including the components to provide the system for a vehicle.

22 Claims, 16 Drawing Sheets

(56) References Cited

U.S. PATENT DOCUMENTS

| | | | |
|---|---|---|---|
| 3,527,316 A * | 9/1970 | Jones, Jr. et al. | 180/437 |
| 3,831,210 A * | 8/1974 | Ow | 280/414.5 |
| 4,102,424 A * | 7/1978 | Heinze | 180/24.02 |
| 4,359,123 A * | 11/1982 | Haupt et al. | 180/436 |
| 4,427,207 A * | 1/1984 | Gafford | 280/43.23 |
| 4,809,179 A | 2/1989 | Klinger et al. | |
| 4,958,584 A | 9/1990 | Williamson | |
| 5,284,353 A * | 2/1994 | Shinji et al. | 280/86.751 |
| 5,813,698 A * | 9/1998 | Spoto et al. | 280/124.106 |
| 5,984,330 A | 11/1999 | Hasshi et al. | |
| 6,036,201 A | 3/2000 | Pond et al. | |
| 6,073,946 A * | 6/2000 | Richardson | 280/86.5 |
| 6,176,496 B1 | 1/2001 | Busch | |
| 6,196,555 B1 | 3/2001 | Gaibler | |
| 6,293,562 B1 * | 9/2001 | Kutscher | 280/6.159 |
| 6,357,768 B1 * | 3/2002 | Chan et al. | 280/124.106 |
| 6,418,363 B2 | 7/2002 | Cochofel et al. | |
| 6,588,777 B1 * | 7/2003 | Heyring | 280/124.106 |
| 6,619,673 B2 * | 9/2003 | Eckelberry et al. | 280/6.151 |
| 6,722,669 B1 | 4/2004 | Stammreich | |
| 6,752,403 B2 * | 6/2004 | Allen et al. | 280/6.157 |
| 6,793,228 B2 * | 9/2004 | Zadok | 280/124.134 |
| 6,817,620 B1 * | 11/2004 | Howard | 280/89.11 |
| 6,899,191 B1 * | 5/2005 | Lykken | 180/182 |
| 7,240,906 B2 | 7/2007 | Klees | |
| 7,293,780 B2 * | 11/2007 | Germain et al. | 280/5.506 |
| 7,300,064 B2 * | 11/2007 | Johnson et al. | 280/124.106 |
| 7,357,396 B2 * | 4/2008 | Dellacha | 280/5.52 |
| 7,390,000 B2 * | 6/2008 | Lee | 280/124.103 |
| 7,401,794 B2 * | 7/2008 | Laurent et al. | 280/5.514 |
| 7,475,894 B2 * | 1/2009 | Hodge | 280/124.116 |
| 7,549,659 B2 * | 6/2009 | Reineck | 280/124.17 |
| 7,648,149 B2 * | 1/2010 | Ryberg et al. | 280/124.106 |
| 8,042,817 B2 | 10/2011 | Motebennur et al. | |
| 8,047,551 B2 * | 11/2011 | Morris et al. | 280/5.514 |
| 8,317,207 B2 | 11/2012 | Mercier | |
| 8,733,768 B1 * | 5/2014 | Shoulders | 280/86.757 |
| 2009/0102152 A1 * | 4/2009 | Wallace | 280/124.11 |
| 2014/0306413 A1 * | 10/2014 | Aldrich | 280/93.511 |
| 2014/0306414 A1 * | 10/2014 | Aldrich | 280/124.11 |
| 2014/0306415 A1 * | 10/2014 | Aldrich | 280/124.116 |

FOREIGN PATENT DOCUMENTS

| | | | | |
|---|---|---|---|---|
| EP | 432519 A1 * | 6/1991 | | B60B 35/10 |
| GB | 2134052 A * | 8/1984 | | B60G 17/00 |
| WO | WO 9429161 A1 * | 12/1994 | | B62D 53/08 |

* cited by examiner

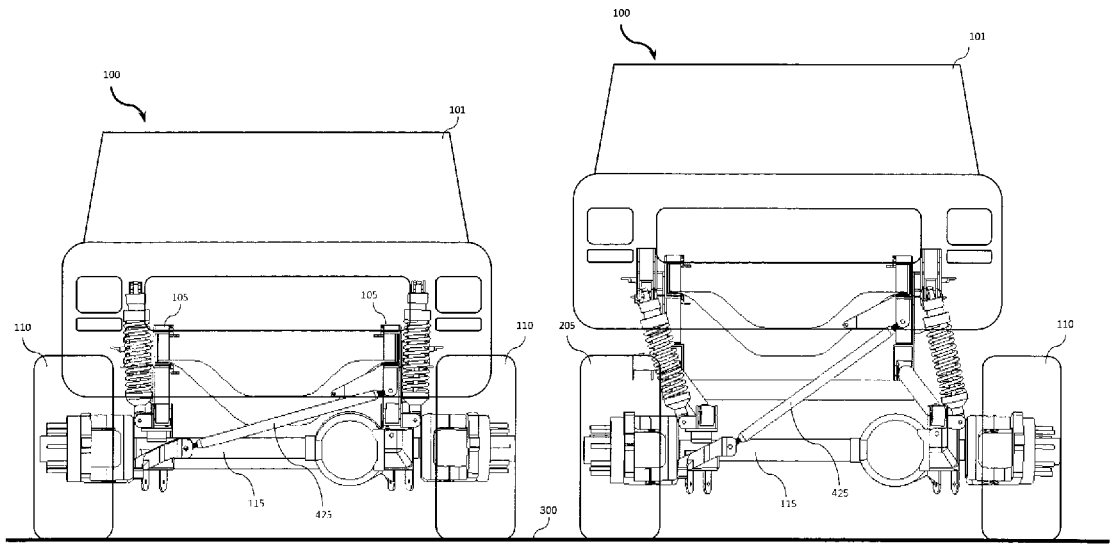
FIG 3A
(Prior Art)
FIG 3B
(Prior Art)
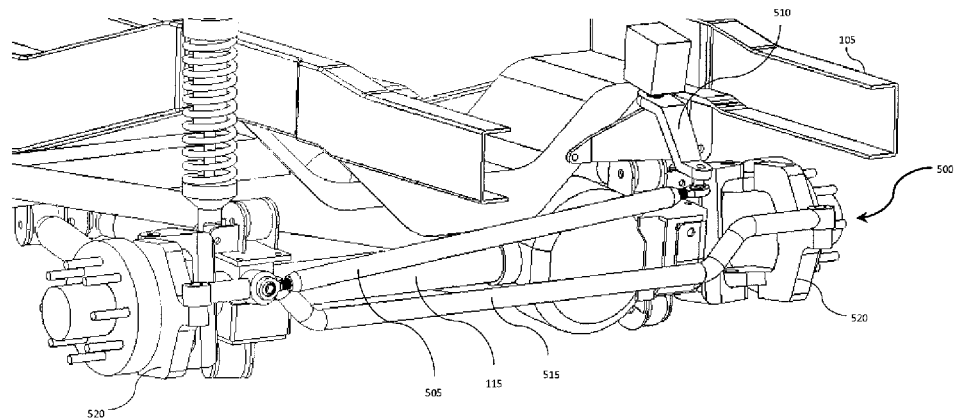
FIG 4
(Prior Art)

ADJUSTABLE RIDE HEIGHT, VEHICLE, SYSTEM AND KIT

RELATED MATTERS

This non-provisional application claims priority to U.S. Provisional Application Ser. No. 61/810,477, filed Apr. 10, 2013, the disclosure of which being herein incorporated by reference to the extent that it is consistent with the present application.

FIELD OF THE DISCLOSURE

The subject matter disclosed herein relates generally to land vehicles. More particularly, the present disclosure concerns land vehicles with an adjustable ride height.

BACKGROUND

Conventional land vehicles include a frame with axles and multiple wheels. The frame is suspended from the axle and wheel assemblies at a given ride height, i.e. ground clearance. Traditionally the ride height of a vehicle is fixed. However, adjustable ride height systems allow for the ride height of a vehicle to be altered.

The ability to adjust the ride height of a land vehicle provides several advantages. Increasing the ride height allows a vehicle to travel over more significant obstacles, e.g. rocks, bumps, downed trees, streams, and other irregularities in the surface over which the vehicle is traveling. An increased ride height also allows a vehicle to operate with larger tires for enhanced off road capability. Decreasing the ride height of a vehicle provides a lower roll center for increased stability and cornering capability, which may be desired for high speed travel over smooth surfaces.

Unfortunately, traditional systems used to adjust the ride height of a vehicle suffer from a limited amount of ride height adjustment capability without significant effort. Additionally, traditional systems used to adjust ride height result in detrimental effects to ride quality, wheel positioning, and/or steering alignment.

To demonstrate these deficiencies, a prior art vehicle 100, typical of a commercially available pickup truck, is illustrated in FIG. 1. The vehicle 100 is comprised of a body 101 attached to a frame 105. The vehicle 100 has a total of four wheels 110, two of which are attached to a straight axle 115 in the front, and two of which are attached to a straight axle 115 in the rear. The wheel 110 is permitted to rotate around the centerline of the straight axle 115, allowing the vehicle 100 to travel over the surface 200. The straight axle 115 illustrated in the rear of the vehicle 100 is positioned beneath the frame 105 via a traditional leaf spring suspension 300. The straight axle 115 illustrated in the front of the vehicle 100 is positioned beneath the frame 105 via a multi-link suspension 400.

The leaf spring suspension 300 and the multi-link suspension 400 are two exemplary prior art ways to position the straight axles 115 relative to the frame 105, support the sprung weight, i.e. the weight of the frame 105, body 101, and passengers/cargo, and provide dampening as the vehicle 100 travels over bumps in the surface 200.

Referring first to the rear of the exemplary vehicle 100 illustrated in FIG. 1, the leaf spring suspension 300 comprises a leaf spring pack 305, pivotally attached to the frame 105 in the front, pivotally attached to a spring shackle 310 in the rear, and bolted to the straight axle 115 via a short lift block 315 which provides the interface surface between the bottom center of the leaf spring pack 305 and the straight axle 115. The spring shackle 310 is pivotally attached to the frame 105, allowing the leaf spring pack 305 to compress or expand as the vehicle 100 travels over bumps in the surface 200. The leaf spring pack 305 performs the function of positioning the straight axle 115 in the front to rear direction, supporting the sprung weight, and establishing the fixed ride height H. The shock 320 is pivotally attached to the frame 105 and the straight axle 115, and provides the dampening function.

Referring now to the front of the exemplary vehicle 100 illustrated in FIG. 1, the multi-link suspension 400 comprises a shock tower 405 fixed to the frame 105. A coilover 410, which comprises a coil spring and a shock, is pivotally attached to the shock tower 405 and pivotally attached to the housing of the straight axle 115. The coilover 410 supports the sprung weight, establishes the ride height H, and provides dampening, but does not position the straight axle 115 in the front to back direction. Alternatively, a separate coil spring and shock, or an air spring and shock may be used in lieu of the coilover 410. The straight axle 115 is positioned front to back by the links 415 which are pivotally attached to the housing of the straight axle 115 and pivotally attached to the frame link mount 420. A coilover 410 may provide a small amount of adjustability to the ride height H (typically 2-4 inches). However, this limited amount of adjustability may not satisfy that which is required for traversing significant obstacles on the surface 200.

Traditional means of adjusting the ride height H are illustrated in FIG. 2 for both the leaf spring suspension 300 and the multi-link suspension 400. In FIG. 2, the ride height H has been increased approximately 13" from that shown in FIG. 1.

With regards to the leaf spring suspension 300 in the rear, the increase in ride height H may be accomplished by substituting the short lift block 315 with a tall lift block 316 and the shock 320 with a long shock 321. This method results in what is known in the art as "axle wrap" due to the longer moment arm created between the base of the leaf spring pack 305 and the surface 200, and requires significant time to alter the ride height. Another traditional means of increasing the ride height H as illustrated in FIG. 2 is to install a large leaf spring pack 306. The large leaf spring pack 306 reduces and/or eliminates the "axle wrap", but typically creates a harsher ride quality than the original leaf spring pack 305 due to the increased spring constant as a result of the increased convexity and/or number of leaves making up the pack. The large leaf spring pack 306 still requires a long shock 321 and significant effort to change the ride height H.

With regards to the multi-link suspension 400 in the front, the increase in ride height H can be accomplished by substituting the coilover 410 with a longer coilover 411. The longer coilover 411 can be expensive, and this substitution requires significant time. Also, since the links 415 travel in an arc, the wheelbase W is shortened as the ride height H is increased, requiring the links 415 to be lengthened to compensate.

FIGS. 3A and 3B each illustrate the front view of the exemplary vehicle 100, depicting a traditional panhard bar 425 pivotally attached to the frame 105 and pivotally attached to the straight axle 115. The traditional panhard bar 425 positions the straight axle 115 in the left to right position relative to the frame 105. As illustrated in FIG. 3B, as the ride height H is increased, the body 101 moves to the side as a result of the traditional panhard bar 425 traveling in an arc. Although the front view of the multi-link suspension 400 is shown, a traditional panhard bar is also used in the same manner as a component of the leaf spring suspension system 300 in the rear of the exemplary vehicle 100.

FIG. 4 illustrates the exemplary vehicle 100 steering system 500 as traditionally used in conjunction with a straight axle 115. The steering system 500 comprises a drag link 505 which is attached at one end via a ball and socket joint to the pitman arm 510 and at the other end via a ball and socket joint to the steering tie bar 515. The steering tie bar 515 is attached at both ends to the spindles 520 via a ball and socket joint (note: in some applications the drag link 505 attaches directly to one of the spindles 520). As the pitman arm 510 translates left and right, the spindles 520 are turned left and right, thus steering the vehicle 100 as illustrated in FIG. 5A (centered), FIG. 5B (turning right), and FIG. 5C (turning left).

The traditional steering system 500 illustrated in FIG. 6 is shown at the lower ride height H. At this specific ride height H, the traditional steering system 500 is effective since the drag link 505 is adjusted to permit the pitman arm 510 to be centered in its travel from left to right, and the angle ω between the drag link 505 and the surface 200 is small. However, as shown in FIG. 7, the traditional steering system 500 suffers limitations as the ride height H of the vehicle is altered. Increasing the ride height H increases the angle ω, which exacerbates what is known in the art as "bump steer." "Bump steer" is a result of the drag link 505 traveling in an arc as the straight axle 115 moves vertical relative to the frame 105. This vertical motion is a result of the vehicle 100 traveling over irregularities in the surface 200. As further illustrated in FIG. 7, changing the ride height H causes the pitman arm 510 to rotate, which causes steering misalignment unless the length of the drag link 505 is adjusted via a replacement drag link to compensate.

As such, there is a need for a system that can be used to adjust the ride height of a vehicle without significant effort, and without significant impacts to the ride quality, wheel positioning, or the steering alignment of a vehicle

SUMMARY

According to one aspect, a vehicle comprises: at least two wheels, a frame; and an adjustable suspension mount linkage including: a first mount link pivotally attached to a mount feature and extending to a device used to support a load on a first wheel, the first mount link pivotally attached to the device, wherein the mount feature is attached to or integrated into the frame of the vehicle; and a second mount link pivotally attached to at least one of the mount feature and a second mount feature, the second mount link extending to the first mount link, the second mount link pivotally attached to the first mount link.

According to another aspect, an adjustable suspension mount kit comprises: a first mount link pivotally attachable to a mount feature attachable to or integrated into a frame of a vehicle, the first mount link extendable to a device used to support a load on a first wheel, the first mount link pivotally attachable to the device; and a second mount link pivotally attachable to at least one of the mount feature and a second mount feature, the second mount link extendable to the first mount link, the second mount link pivotally attachable to the first mount link, wherein the adjustable suspension mount kit is configured to raise or lower a wheel with respect to the frame when the first mount link and the second mount link are installed on the vehicle and when at least one of the first mount link and the second mount link is expanded or replaced by a third mount link having a different length than at least one of the first mount link and the second mount link.

According to another aspect, an adjustable suspension mount system comprises: a first mount link pivotally attached to a mount feature and extending to a device used to support a load on a first wheel, the first mount link pivotally attached to the device, wherein the mount feature is attached to or integrated into the frame of the vehicle; and a second mount link pivotally attached to at least one of the mount feature and a second mount feature, the second mount link extending to the first mount link, the second mount link pivotally attached to the first mount link.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3A depicts a front view of the prior art vehicle of FIGS. 1-2;

FIG. 3B depicts a front view of the prior art vehicle of FIGS. 1-3A after the frame has been raised with respect to the wheels of the prior art vehicle;

FIG. 4 depicts a perspective view of a steering system of the prior art vehicle of FIGS. 1-3B;

DETAILED DESCRIPTION

A detailed description of the hereinafter described embodiments of the disclosed apparatus and method are presented herein by way of exemplification and not limitation with reference to the Figures.

Figure 1:
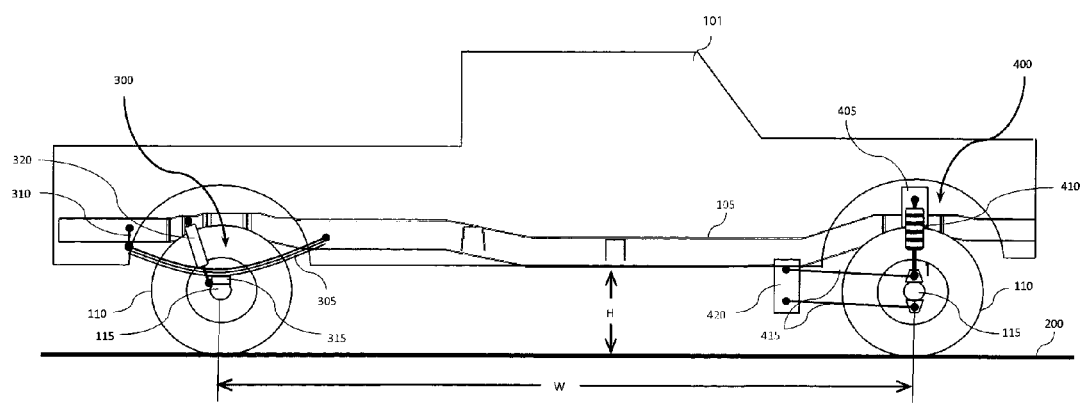
FIG. 1 depicts a side view of a prior art vehicle.
Figure 8:
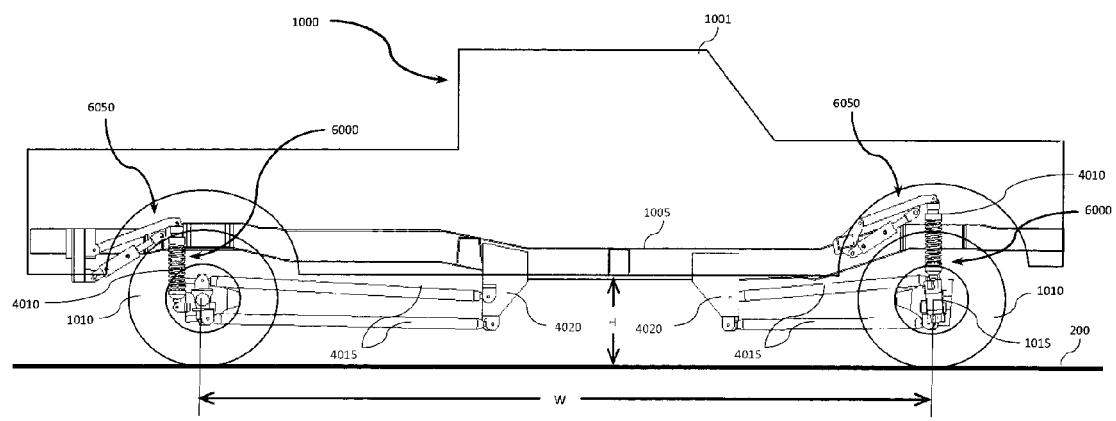
FIG. 8 depicts a side view of a suspension system of a vehicle according to one embodiment.

Referring firstly to FIG. 8, an exemplary vehicle 1000 is shown at the same ride height H as that shown by the vehicle 100 in FIG. 1. It should be understood that the vehicle 1000 may be a modified version of the vehicle 100, or alternately may be a different vehicle entirely. Furthermore, while the vehicle 1000 is shown with the frame of a truck, the principles of the present invention may be applicable to any type of land vehicle with a suspension system. FIG. 8 illustrates the exemplary vehicle 1000 including an adjustable multi-link suspension 6000 at both the front and rear in lieu of the traditional multi-link suspension 400 in the front and the leaf spring suspension 300 in the rear described hereinabove. The adjustable multi-link suspension 6000 illustrated in FIG. 8 permits ride height adjustment without significant impacts to axle positioning relative to the frame.

Figure 9:
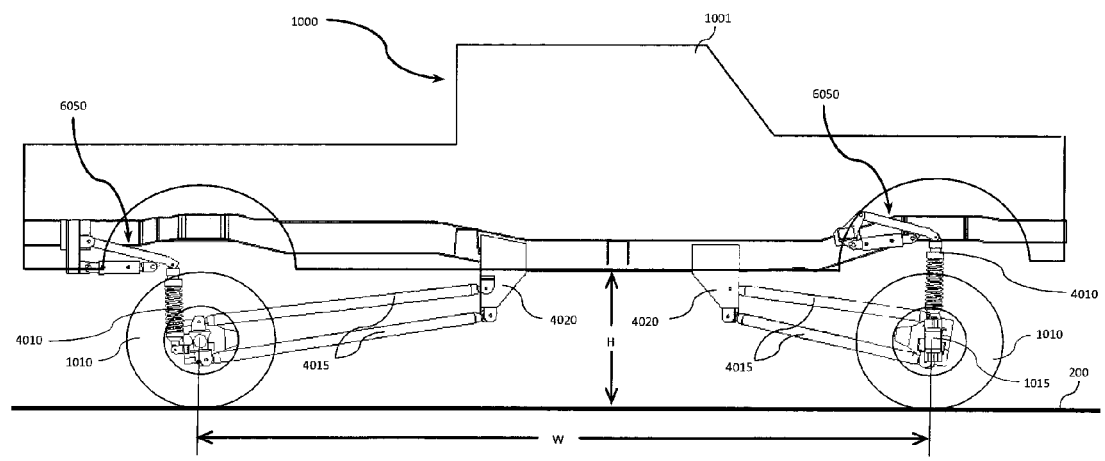
FIG. 9 depicts a side view of the suspension system of the vehicle of FIG. 8 after a frame of the vehicle has been raised with respect to wheels of the vehicle according to one embodiment.

The vehicle 1000 includes links 4015. The links 4015 may be pivotally connected to the straight axle 1015 with axle link mounts 4017 (shown in FIGS. 12A and 12B) and may be pivotally connected to the frame link mount 4020. The link 4015, as illustrated in FIG. 8, may be longer than the link 415 shown in FIG. 1. The link 4015 may further mount to a frame link mount 4020 that extends further down from a frame 1005 of the vehicle 1000. The link 4015 and frame link mount 4020 geometry illustrated in FIG. 8 may result in negligible changes to the wheelbase W as the ride height is altered. For example, as the ride height is increased by 13", the wheel base may only be reduced by 0.5" due to the distance that the frame link mount 4020 is configured to extend below the frame 1005. The height of this frame link mount 4020 may further be adjusted depending on the diameter of the intended wheels to be utilized on the vehicle 1000. For example, if the wheel has a larger diameter, the frame link mount 4020, and consequently the links 4015, may extend from a lower position of the vehicle. In the embodiment shown, the links 4015 are shown to be extending from the frame link mount 4020 in an upward direction to wheels 1010 when the ride height is at its lowest (as shown in FIG. 8). Then, as the ride height is increased, as shown in FIG. 9, the links 4015 may extend from the frame link mount 4020 in a downward direction toward the wheels 1010.

The vehicle 1000 further includes a coilover 4010 at each of the wheels 1010. The coilover 4010 in FIG. 8 may be the same as the coilover 410 in FIG. 1. Alternately, the coilover 4010 may be substituted in the adjustable multi-link suspension 6000 by other device that supports the sprung weight of the vehicle and/or wheel and/or provides dampening. For example, the coilover 4010 may be a separate coil and shock, or an air spring and shock.

Figure 2:
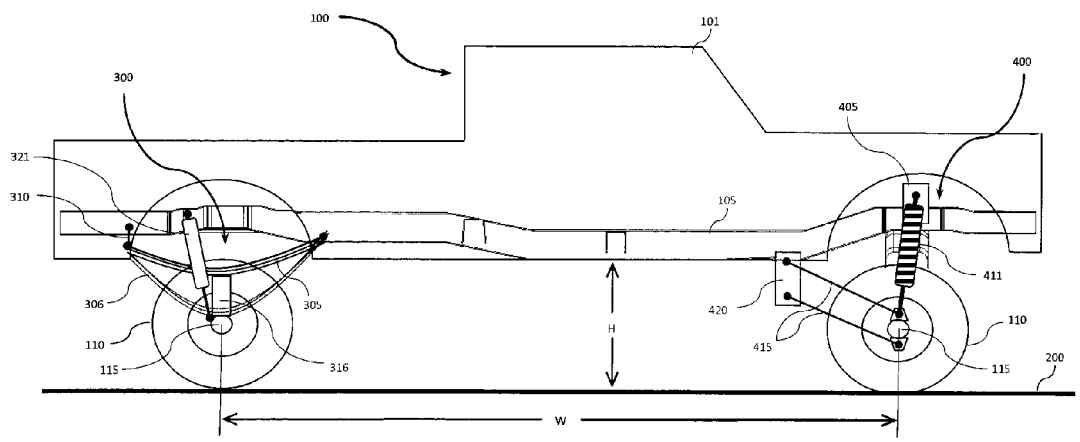
FIG. 2 depicts another side view of the prior art vehicle of FIG. 1 after the frame has been raised with respect to wheels of the prior art vehicle.
Figure 11A:
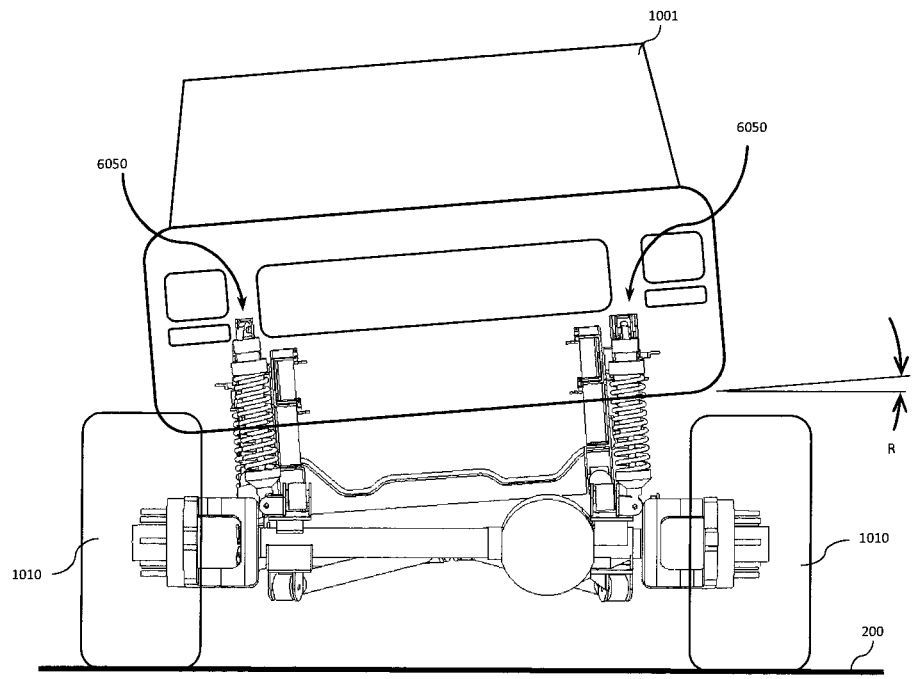
FIG. 11A depicts a front view of the suspension system of the vehicle of FIGS. 8-10A after the frame at the left side of the vehicle has been raised with respect to the wheels of the vehicle according to one embodiment.
Figure 11B:
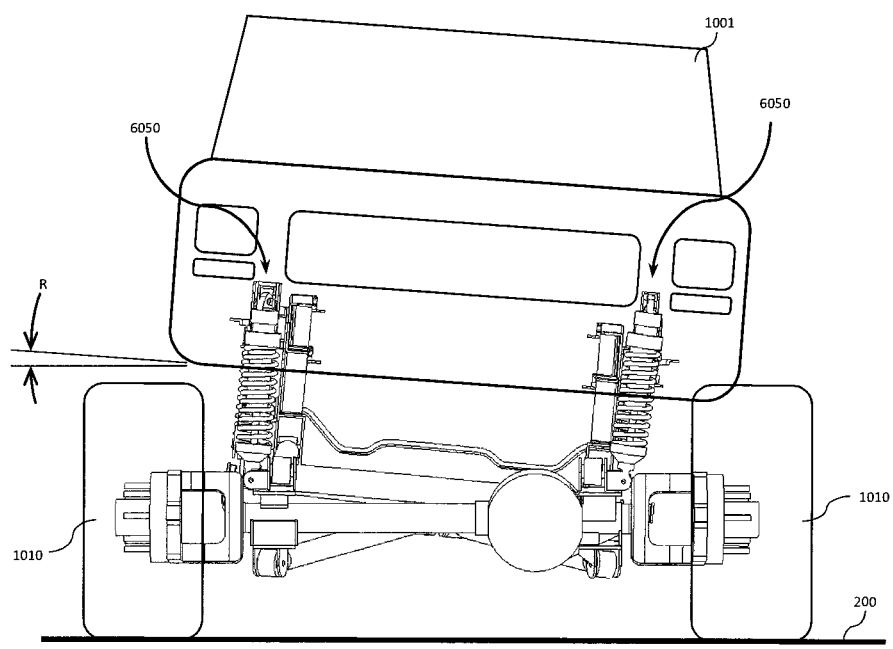
FIG. 11B depicts a front view of the suspension system of the vehicle of FIGS. 8-11A after the frame at the right side of the vehicle has been raised with respect to the wheels of the vehicle according to one embodiment.
Figure 12A:
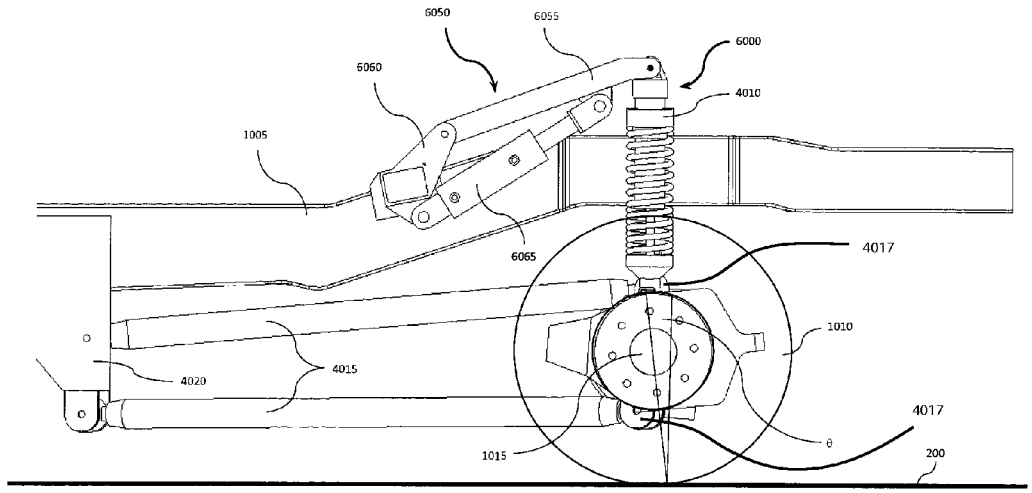
FIG. 12A depicts a side view of an adjustable suspension mount of the vehicle in FIGS. 8-11B in a lowered position according to one embodiment.
Figure 12B:
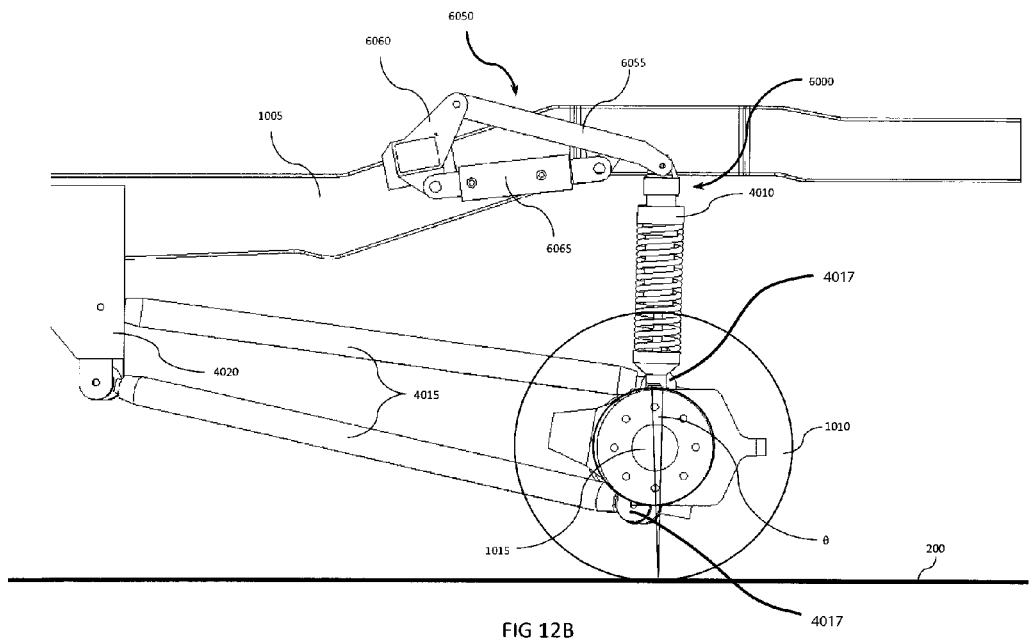
FIG. 12B depicts a side view of an adjustable suspension mount of the vehicle in FIGS. 8-12A in a raised position according to one embodiment.

As further illustrated in FIG. 8, the shock tower 405 of the multi-link suspension 400 from FIG. 1 has been replaced in the adjustable multi-link suspension 6000 by an adjustable suspension mount 6050. The adjustable suspension mount 6050 may provide a simple and reliable means of achieving significant ride height H adjustment without the need to remove and replace components, and without overly complicated mechanisms. The present embodiment of the adjustable suspension mount 6050 may adjust the ride height H by approximately 13" to that illustrated in FIG. 9, consistent with the increased ride height H shown in FIG. 2 of the prior art. In addition to the negligible wheel base W changes, as described hereinabove, the embodiments shown in FIGS. 8-17B, including the link 4015 and frame link mount 4020, also provide negligible or small changes in the castor angle θ as depicted in FIGS. 12A and 12B. For example, the caster angle θ change may be between zero and five degrees. Furthermore, the camber angle of the vehicle 1000 may be controlled in the exemplary embodiment of the adjustable multi-link suspension 6000 by utilizing a straight axle 1015. If an independent suspension was used in lieu of the straight axle 1015, a means to control the camber angle as the ride height H is altered may further be utilized to allow for proper operation and prevent excessive tire wear.

Figure 10A:
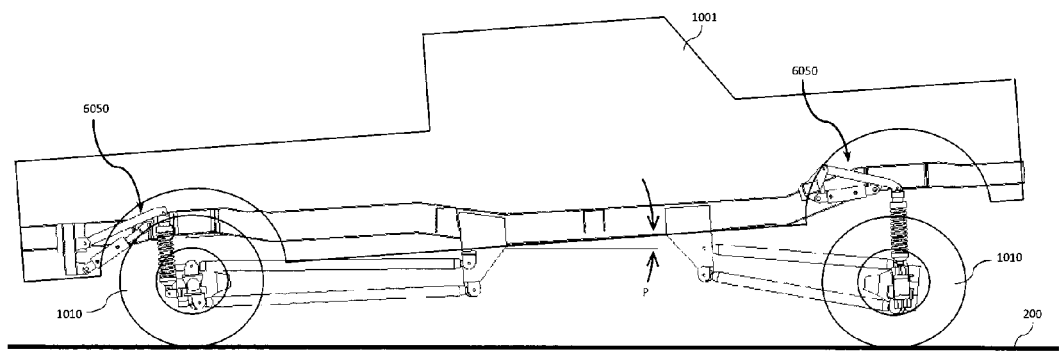
FIG. 10A depicts a side view of the suspension system of the vehicle of FIGS. 8-9 after the frame at the front of the vehicle has been raised with respect to the wheels of the vehicle in accordance with one embodiment.
Figure 10B:
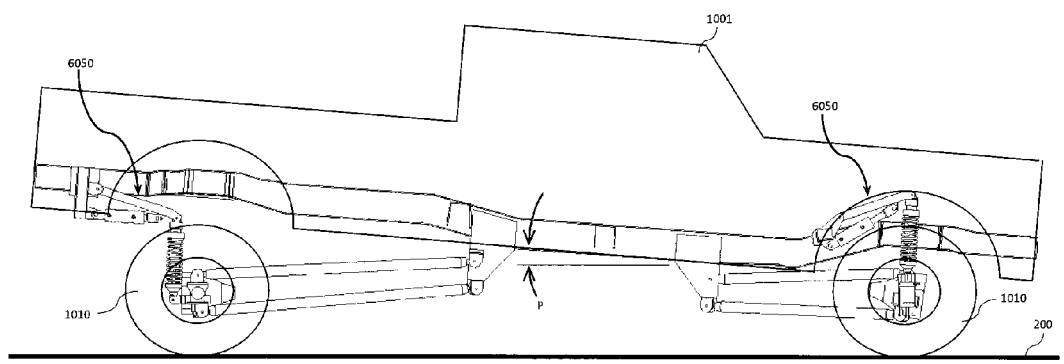
FIG. 10B depicts a side view of the suspension system of the vehicle of FIGS. 8-10A after the frame at the rear of the vehicle has been raised with respect to the wheels of the vehicle in accordance with one embodiment.

FIGS. 10A and 10B illustrate the capability of the adjustable suspension mount 6050 to further control the pitch P of the body 1001 when the adjustable suspension mount 6050 is used on both the front and the rear of the vehicle 1000. FIGS. 11A and 11B illustrate the capability of the adjustable suspension mount 6050 to further control the roll R of the body

1001 when the adjustable suspension mount 6050 is used on both the right and left side of the vehicle 1000.

As shown in FIGS. 12A and 12B, the adjustable suspension mount 6050 may include a first mount link 6055 and a second mount link 6065. The first mount link 6055 may be pivotally attached at one end to a mount bracket 6060 or directly to the frame 1005, and pivotally attached at the other end to the coilover 4010. Whatever the mount feature (i.e. the mount bracket 6060 or the frame 1005), the first mount link 6055 may be attached so that the first mount link 6055 is rotatable about the attachment location. Again, it should be noted that the coilover 4010 may be substituted with other art that supports the sprung weight of the vehicle 1000 or supports the load on the wheel, as described hereinabove. The second mount link 6065 may be pivotally attached at one end to the mount feature or mount bracket 6060 or directly to the frame 1005, and pivotally attached at the other end to the first mount link 6055. In another embodiment, it should be understood that the second mount link 6065 may be pivotally attached to the coilover device 4010 and the first mount link 6055 may be pivotally attached to the second mount link 6065. It should further be understood that at least one of the first mount link 6055 and the second mount link 6065 may be telescopic in nature and used to increase or decrease the ride height H. In other embodiments, more than two mount links may be provided to control the ride height H. For example, the first mount link may be provided having a first length, the second mount link may be provided having a second length, and a third mount link may be provided having a third length that is different than at least one of the first length and the second length. Replacing at least one of the first mount link and the second mount link with the third mount link may be configured to increase or decrease the ride height H.

FIG. 12A illustrates the adjustable suspension mount 6050 at the lowest ride height H, consistent with that which is shown in FIG. 8. FIG. 12B illustrates the adjustable suspension mount 6050 at the highest possible ride height H consistent with that which is shown in FIG. 9. The illustrated embodiment of the adjustable suspension mount 6050 may, for example, allow for an increase in ride height H of approximately 13", without changing the ride quality of a typical pickup truck such as a Ford F150, F250 or F350®. Other embodiments may result in increased or decreased ride height H adjustment capability based on the lengths of the first mount link 6055, second mount link 6065, and the position of pivot points on the mount bracket 6060 or frame 1005. For example, lengthening the components may result in maximum ride height increase capabilities to be greater than the embodiment shown.

In FIGS. 12A and 12B, the illustrated embodiment of the second mount link 6065 may be a hydraulic cylinder that allows the ride height H to be adjusted remotely or via wired communication (either manually or dynamically) through the control system of a hydraulic pump and valves. In other embodiments the first mount link 6055 may be a hydraulic cylinder in lieu of the second mount link 6065, or both the first mount link 6055 and second mount link 6065 may be hydraulic cylinders. However, in other embodiments at least one of the first mount link 6055 and the second mount link 6065 may include solid links of various lengths that can be removed and replaced to alter the ride height H, or other adjustable link art (e.g. a turnbuckle or air spring). However, in the embodiment which includes a control system, a single remote may be utilized. This remote may be installed in the dashboard of the vehicle, or may alternately be a remote control which may be completely mobile and not tied to the vehicle in any way. The control may be capable of raising each of the four wheels at the same time, lowering each of the four wheels at the same time, or raising and lowering the wheels separately and in any combination. Still further, the control system may be mounted in the bed of the truck abutting the cabin.

Figure 20A:
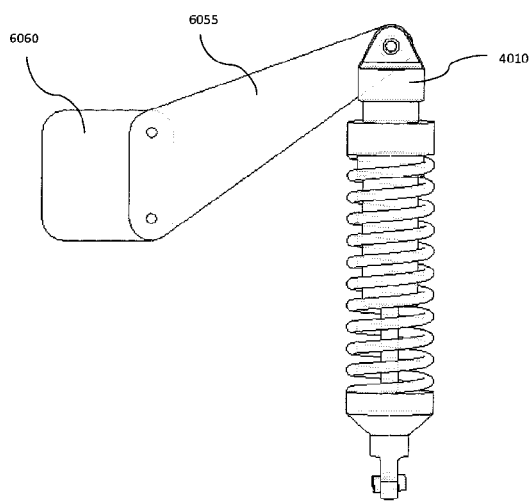
FIG. 20A depicts a side view of an adjustable suspension mount of the vehicle in FIGS. 8-11B in a lowered position according to another embodiment.
Figure 20B:
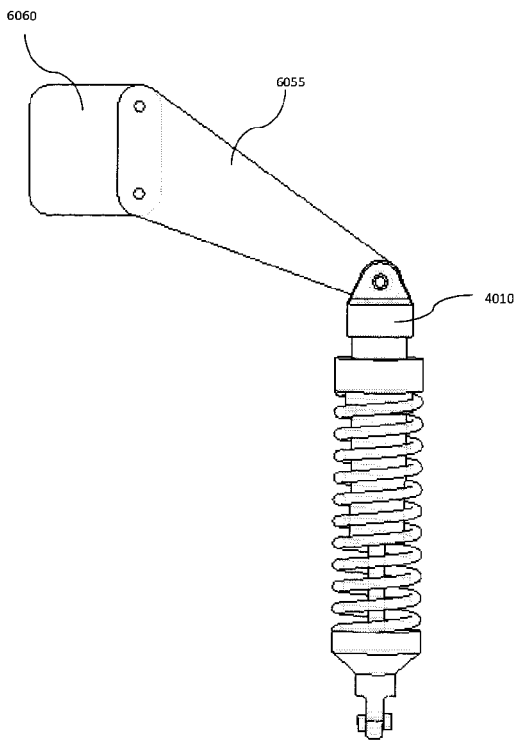
FIG. 20B depicts a side view of an adjustable suspension mount of the vehicle in FIGS. 8-12A in a raised position according to another embodiment.

Another embodiment of the adjustable suspension mount 6050 is shown in FIG. 20A with the coilover 4010 in a raised position (i.e. vehicle 1000 is lowered). As illustrated in FIG. 20A, the adjustable suspension mount 6050 may include the first mount link 6055 having a first attachment point, a second attachment point, and a third attachment point. The first attachment point may be pivotally connected to a first mount feature and the second attachment point may be pivotally connected to a second mount feature. The first and second mount feature may be a bolt, or the like. In one embodiment, these may not be pivotally connected once they are both attached, but instead remain in a fixed position. The first and second mount features may be located on at least one of the mount bracket 6060 or the frame 1005. The first mount link 6055 may extend from the mount bracket 6060 or frame 1005 and pivotally connect through a third attachment point to the coilover 4010. As shown in FIG. 20B, The first mount link 6055 may be configured to be disconnected and flipped over such that the second attachment point is pivotally connected to the first mount feature, the first attachment point is pivotally connected to the second mount feature, and the third attachment point is again connected to the coilover 4010, resulting in the coilover 4010 being lowered as shown in FIG. 20B (i.e. raising the vehicle 1000).

Figure 21A:
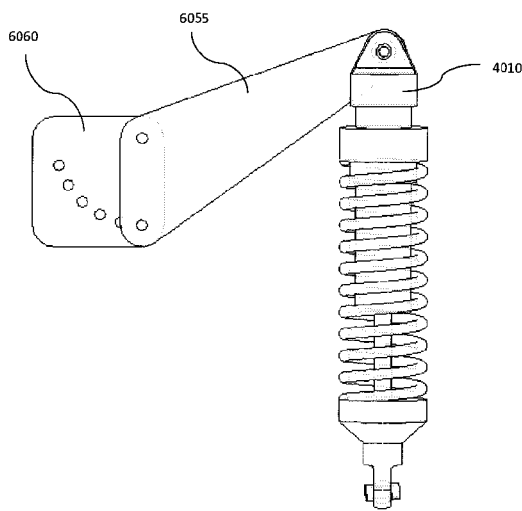
FIG. 21A depicts a side view of an adjustable suspension mount of the vehicle in FIGS. 8-11B in a lowered position according to yet another embodiment.
Figure 21B:
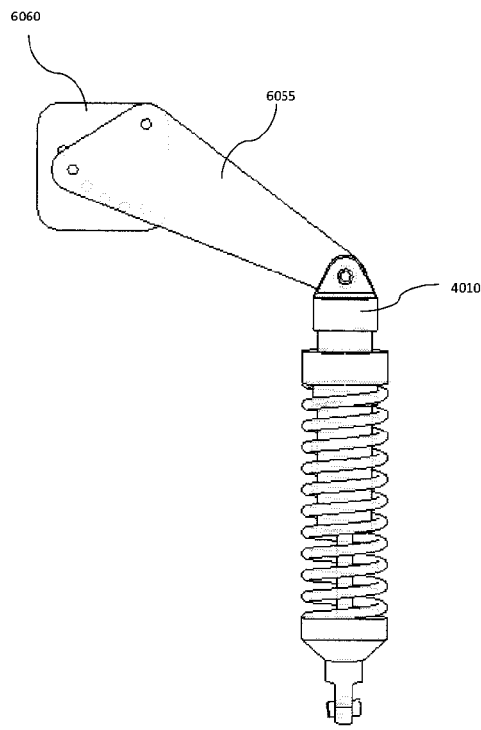
FIG. 21B depicts a side view of an adjustable suspension mount of the vehicle in FIGS. 8-12A in a raised position according to yet another embodiment.

Yet another embodiment of the adjustable suspension mount 6050 is shown in FIG. 21A with the coilover 4010 in a raised position (i.e. vehicle 1000 is lowered). As illustrated in FIG. 21A, the adjustable suspension mount 6050 may include the first mount link 6055 having a first attachment point, a second attachment point, and a third attachment point. The first attachment point may be pivotally connected to a first mount feature and the second attachment point may be pivotally connected to a second mount feature. The first and second mount features may be located on at least one of the mount bracket 6060 or the frame 1005. The mount bracket 6060 or the frame 1005 may have a third mount feature located the same distance from the first mount feature as the second mount feature. The first mount link 6055 may extend from the mount bracket 6060 or frame 1005 and pivotally connect through the third attachment point to the coilover 4010. The second mount feature may be configured to disconnect from the mount bracket 6060 or frame, and the first mount link 6055 may be configured to rotate about the first mount feature. The second mount feature may then be reconnected to the mount bracket 6060 at another location, resulting in the coilover 4010 being lowered as shown in FIG. 21B (i.e. raising the vehicle 1000). Several attachment locations for the second mount feature may be disposed on the mount bracket 6060 or frame. As will be understood from the Figures, these attachment locations may provide for different ride heights. These features may be disposed in a radial arrangement about the first mount feature and first attachment point.

Figures 13A, 13B:
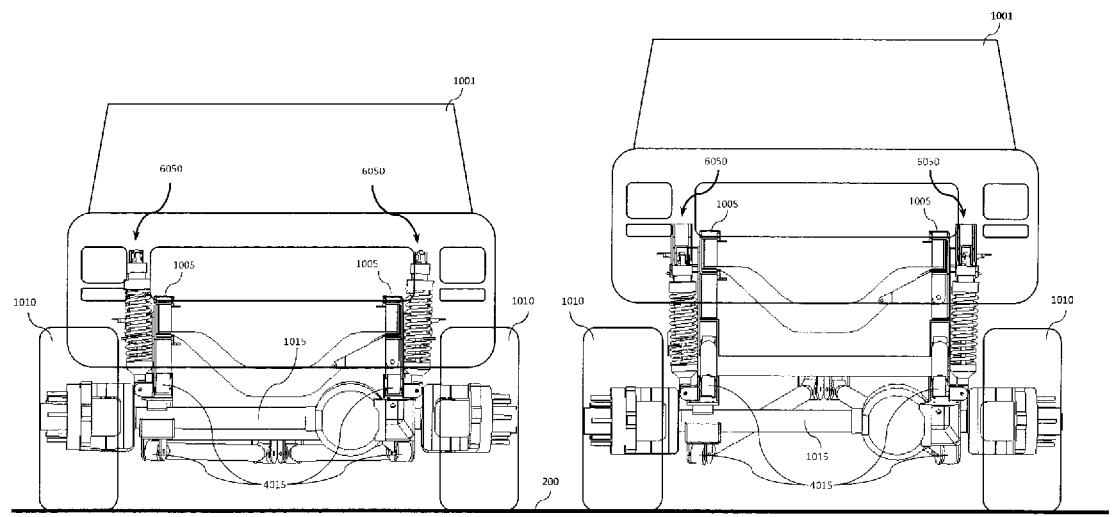
FIG. 13A depicts a front view of the suspension system of the vehicle in FIGS. 8-12B in a lowered position in accordance with one embodiment.
FIG. 13B depicts a front view of the suspension system of the vehicle in FIGS. 8-13A in a raised position in accordance with one embodiment.

As illustrated in FIGS. 13A and 13B, the links 4015 may be mounted at an angle. This is known as "triangulation" and may be utilized to eliminate the need for a traditional panhard bar 425 as illustrated in FIG. 3. As further illustrated in FIGS. 13A and 13B, as the ride height H is altered, the "triangulation" provides a benefit over the traditional panhard bar 425 since the "triangulation" may control the left to right position of the straight axle 1015 beneath the frame 1005, without causing the body 1001 of the vehicle 1000 to translate sideways as the ride height H is altered. In other embodiments, all four links may be angled: two of the links 4015 may be angled inward as shown and two of the links 4015 may be angled outward.

Figure 14A:
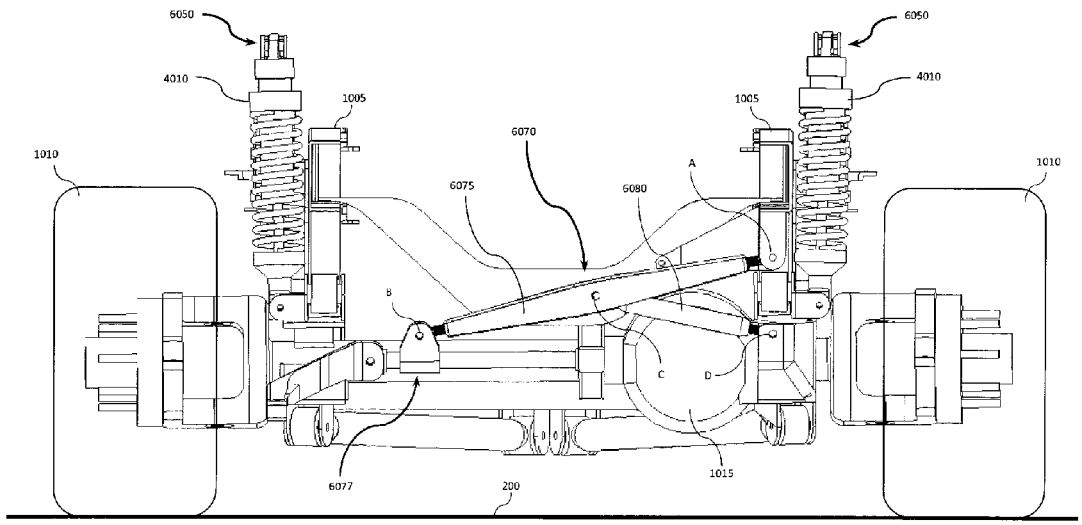
FIG. 14A depicts a front view of a panhard linkage of the vehicle in FIGS. 8-13B in a lowered position in accordance with one embodiment.
Figure 14B:
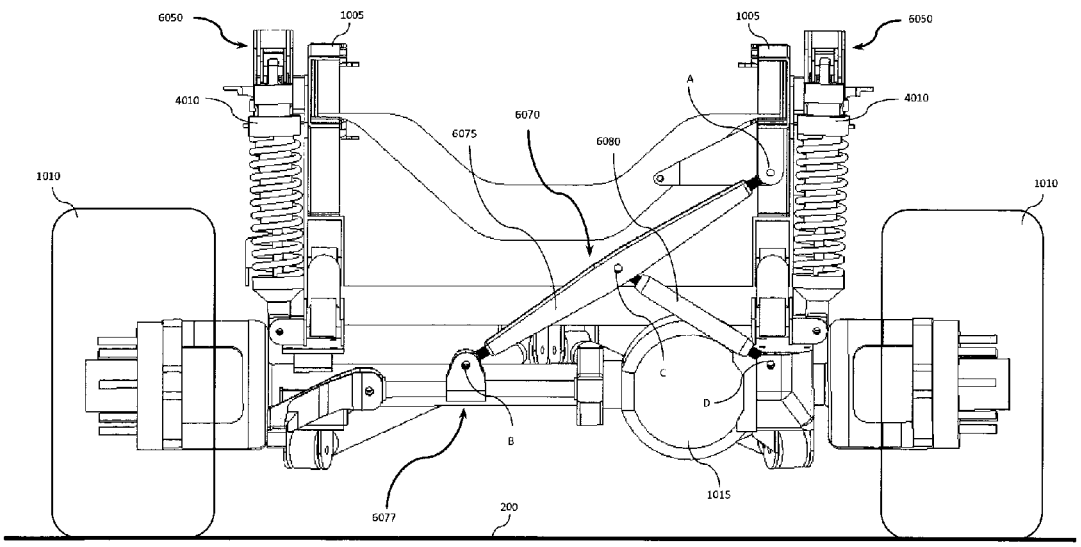
FIG. 14B depicts a front view of the panhard linkage of the vehicle in FIGS. 8-14A in a raised position in accordance with one embodiment.
Figure 18A:
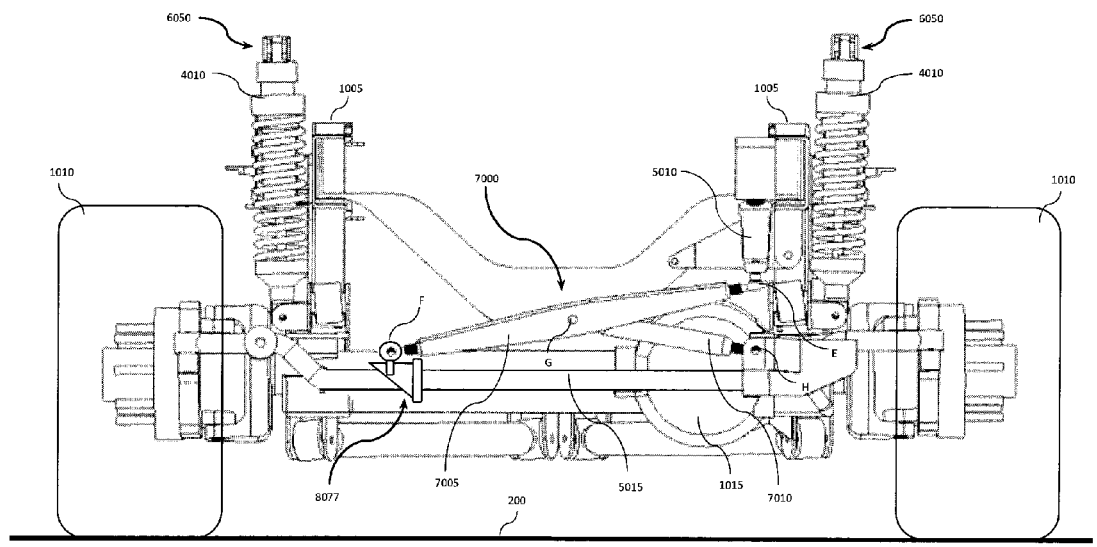
FIG. 18A depicts a front view of another steering system in a lowered position in accordance with one embodiment.
Figure 18B:
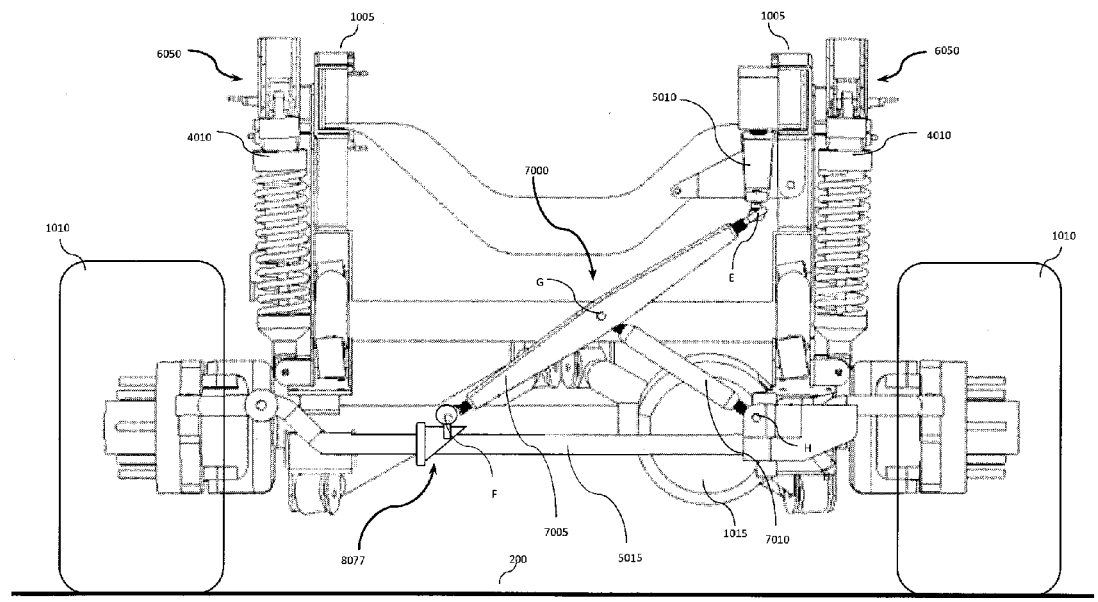
FIG. 18B depicts a front view of the steering system of FIG. 18A in a raised position in accordance with one embodiment.
Figure 19A:
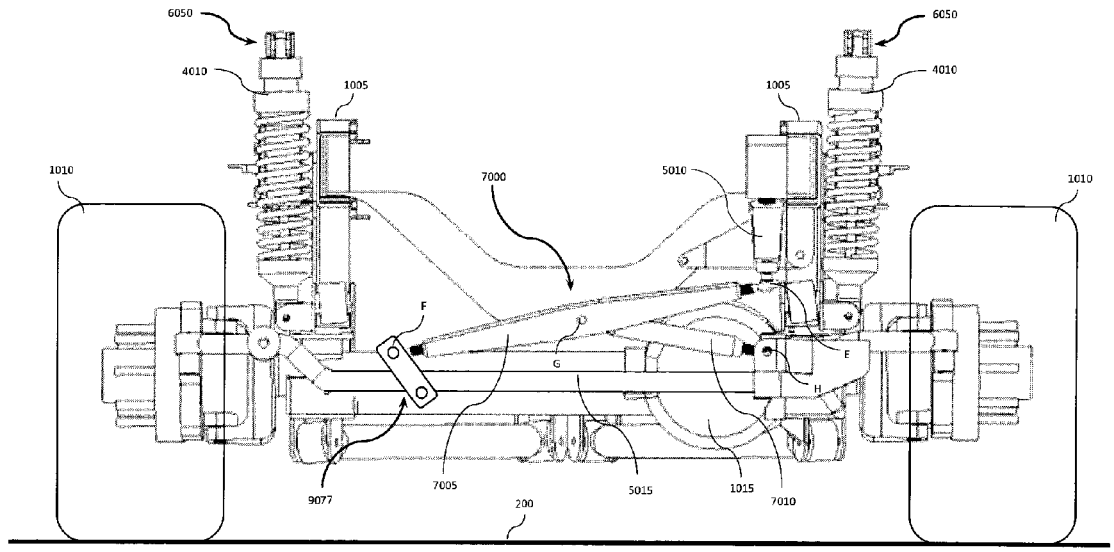
FIG. 19A depicts a front view of another steering system in a lowered position in accordance with one embodiment.
Figure 19B:
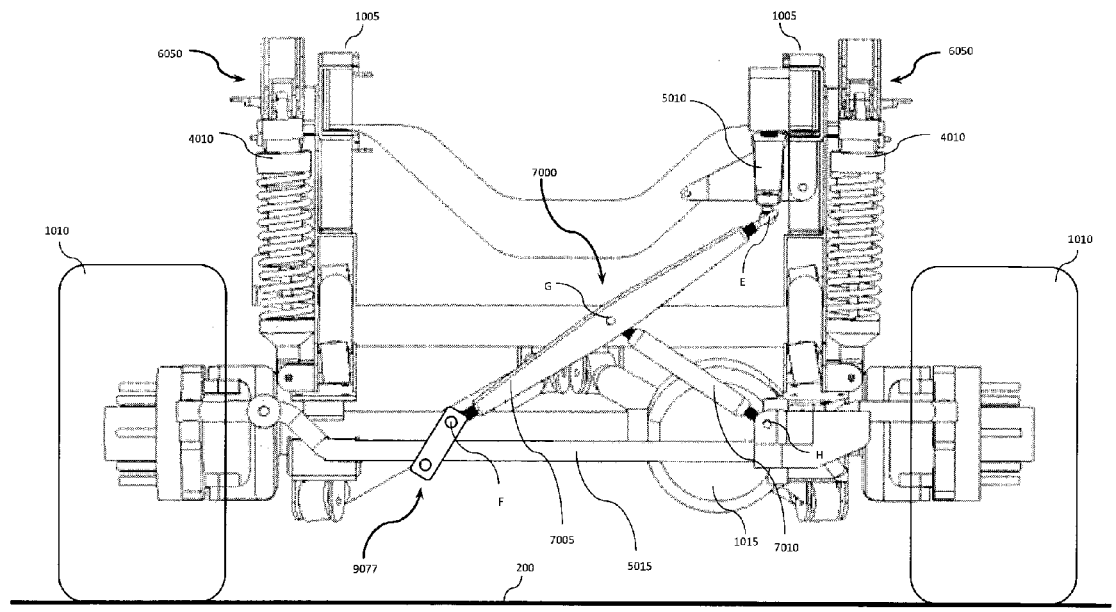
FIG. 19B depicts a front view of the steering system of FIG. 19A in a raised position in accordance with one embodiment.

In lieu of, or in conjunction with, the triangulation of the links 4015, as shown in FIGS. 14A and 14B a panhard linkage 6070 may be used in place of the traditional panhard bar 425 for left/right (i.e. sideways) control of the frame 1005 without altering the left/right position of the frame 1005 as the ride height H changes. The panhard linkage 6070 is shown installed at a lowered (FIG. 14A) and raised (FIG. 14B) ride height H. The panhard linkage 6070 may be an element of the adjustable multi-link suspension 6000. The panhard linkage 6070 may include a long link 6075 and a short link 6080. The long link 6075 may be pivotally connected to the existing mount used for the traditional panhard bar 425 at a first panhard location A and connected to the straight axle 1015 via a pivoting and sliding joint 6077 at a second panhard location B. Alternatively, the long link 6075 may be pivotally connected at the second panhard location B to a panhard arm joint (not shown) pivotally connected to a vertical axis on the straight axle 1015 or a panhard rod joint (not shown) pivotally connected to a horizontal axis on the straight axle 1015. The principles of the panhard arm joint and panhard rod joint are similar to those of the arm joint 8077 as illustrated in FIGS. 18A and 18B and rod joint 9077 as illustrated in FIGS. 19A and 19B. The arm joint 8077 or rod joint 9077 are described hereinbelow with respect to the steering linkage 7000.

In the embodiment shown, the short link 6080 may be pivotally connected at a third panhard location C to the long link 6075 and pivotally connected to the straight axle 1015 at a fourth panhard location D. The distance from the first panhard location A to the second panhard location B may be, for example, twice the distance from the third panhard location C to the fourth panhard location D. The fourth panhard location D may be positioned vertically below the first panhard location A. Still further, the second panhard location B may be positioned horizontally from the fourth panhard location D.

Adding the panhard linkage 6070 to the adjustable multi-link suspension 6000 may result in reduced left/right motion of the straight axle 1015 as the vehicle 1000 turns, or as the vehicle 1000 traverses an angled surface 200 (for example, a side hill). It should be understood that the first, second, third and fourth panhard locations A, B, C and D are referred to as "panhard" locations simply to distinguish these locations from the "steering" locations of the steering linkage 7000 described hereinbelow. The terms "panhard" and "steering" are not meant to impart any further meaning to the locations other than simply establishing the difference.

Figure 15:
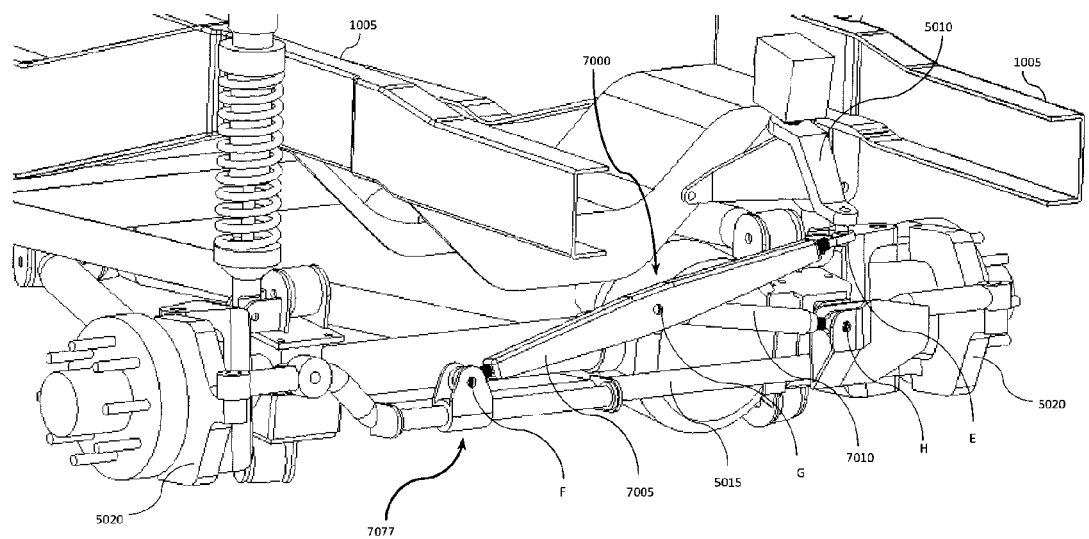
FIG. 15 depicts a perspective view of the steering system of the vehicle of FIGS. 8-14B in a lowered position in accordance with one embodiment.

FIG. 15 illustrates a perspective view of the preferred embodiment of a steering linkage 7000. The steering linkage 7000 may replace the drag link 505 of the traditional steering system 500 as illustrated in FIG. 4. The steering linkage 7000 may include a long link 7005 and a short link 7010. The long link 7005 may be connected via a ball and socket joint, for example, to a pitman arm 5010 at a first steering location E and connected to a steering tie bar 5015 via a pivoting and/or sliding joint 7077 at a second steering location F. Alternatively, the long link 7005 may be connected via a ball and socket joint at the second steering location F to an arm joint 8077 as illustrated in FIG. 18A (vehicle lowered) and 18B (vehicle raised). The arm joint 8077 may be pivotally connected to the steering tie bar 5015 and configured to rotate about a vertical axis such that there is little to no vertical motion of the second steering location F as the arm joint 8077 rotates due to changes in ride height H. Still further, the long link 7005 may be pivotally connected at the second steering location F to a rod joint 9077 as illustrated in FIG. 19A (vehicle lowered) and 19B (vehicle raised). The rod joint 9077 may be pivotally connected to the steering tie bar 5015 and configured to pivot about a horizontal axis on the steering tie bar 5015 such that there is vertical motion of the second steering location F (i.e. steering location F travels in an arc when viewed from the front of the vehicle 1000) as the rod joint 9077 rotates due to changes in ride height H. The short link 7010 may be pivotally connected at a third steering location G to the long link 7005 and pivotally connected to the steering tie bar 5015 at a fourth steering location H. The distance from the first steering location E to the second steering location F may be, for example, twice the distance from the third steering location G to the fourth steering location H. Still further, the fourth steering location H may be positioned vertically below the first steering location E. Moreover, the second steering location F may be positioned horizontally from the fourth steering location H.

Figure 5A:
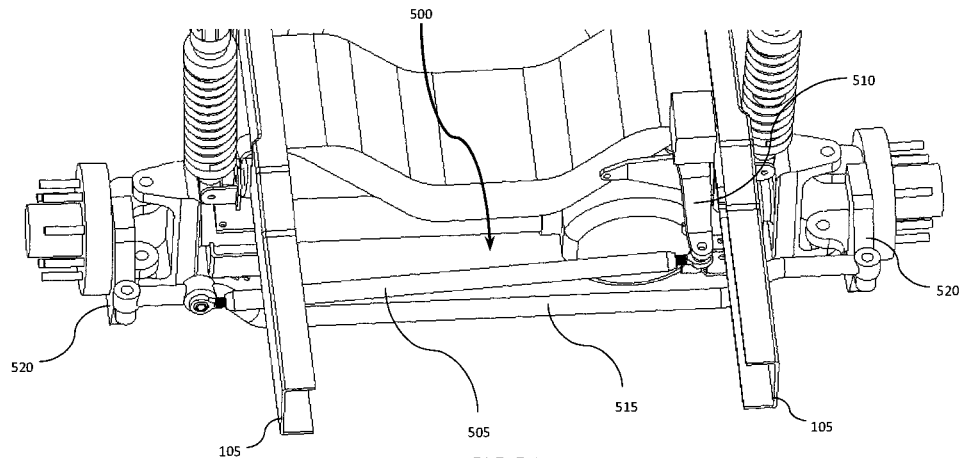
FIG. 5A depicts a perspective view of a steering system of the prior art vehicle of FIGS. 1-4 with the steering centered.
Figure 5B:
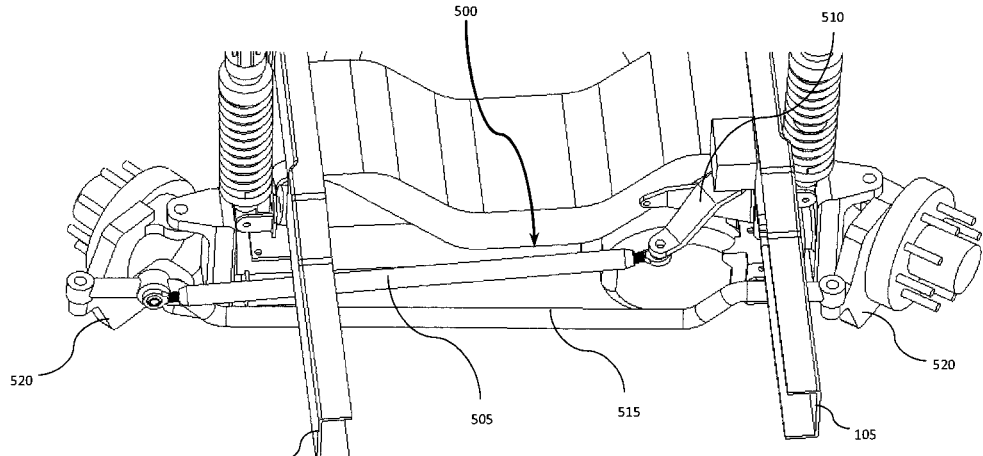
FIG. 5B depicts a perspective view of the steering system of the prior art vehicle of FIGS. 1-5A after being steered to the right.
Figure 5C:
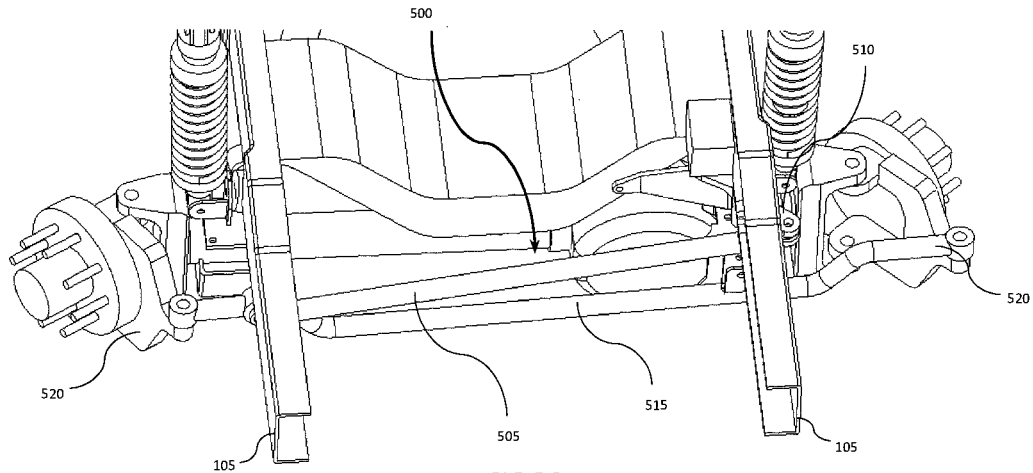
FIG. 5C depicts a perspective view of the steering system of the prior art vehicle of FIGS. 1-5B after being steered to the left.
Figure 6:
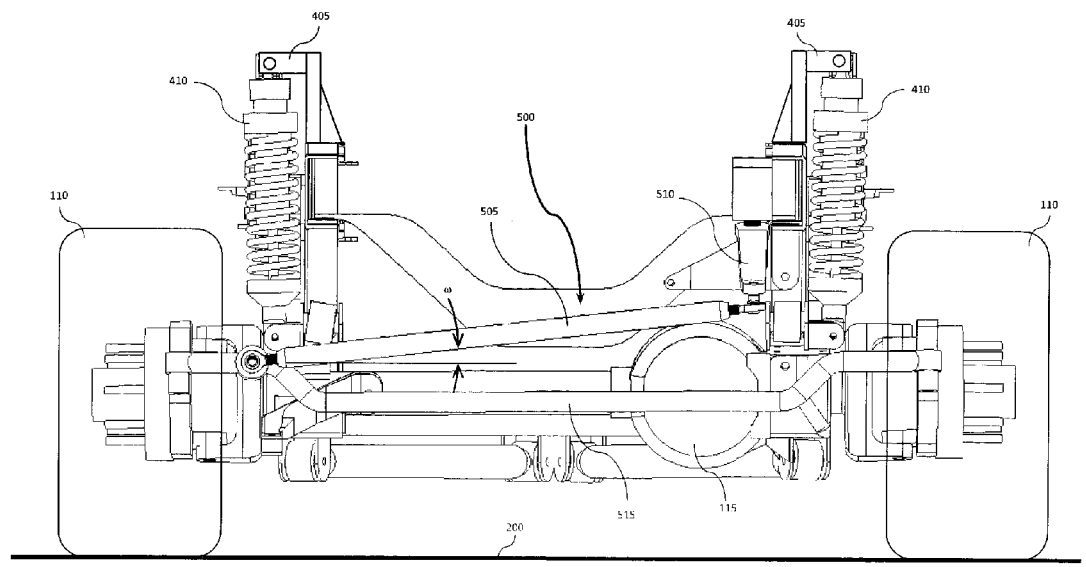
FIG. 6 depicts a front view of the prior art steering system of FIGS. 4-5C.
Figure 7:
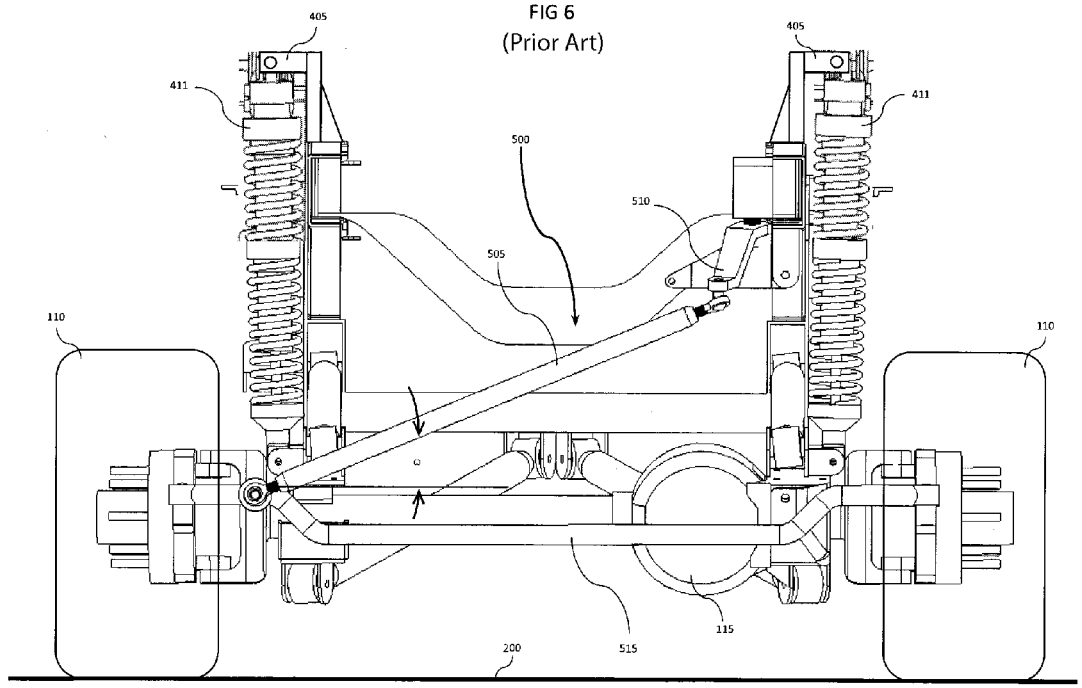
FIG. 7 depicts a front view of the prior art steering system of FIGS. 4-6 after the frame has been raised with respect to the wheels of the vehicle.
Figure 16A:
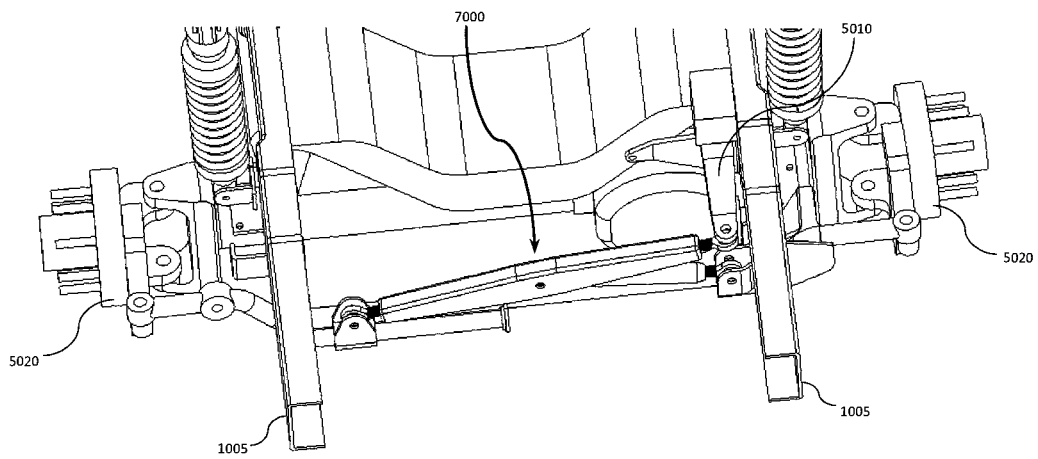
FIG. 16A depicts a perspective view of the steering system of the vehicle of FIGS. 8-15 with the steering centered.
Figure 16B:
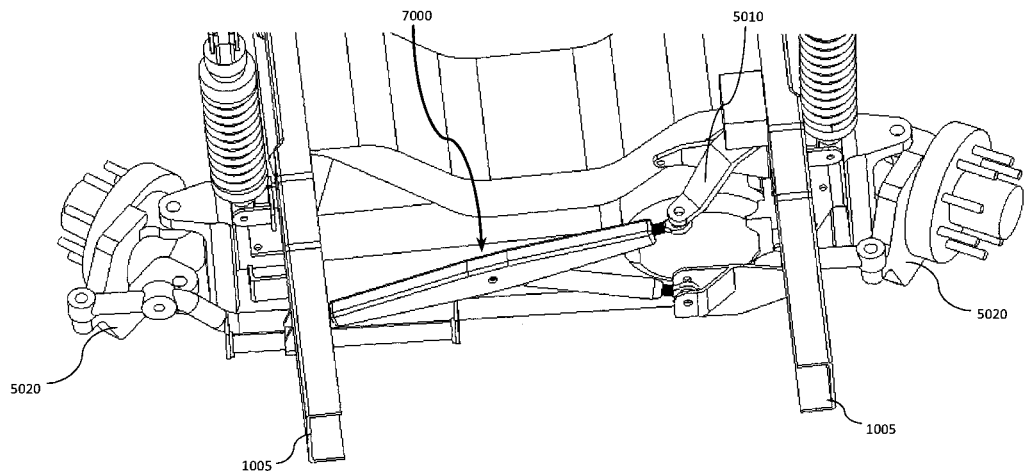
FIG. 16B depicts a perspective view of the steering system of the vehicle of FIGS. 8-16A after being steered to the right.
Figure 16C:
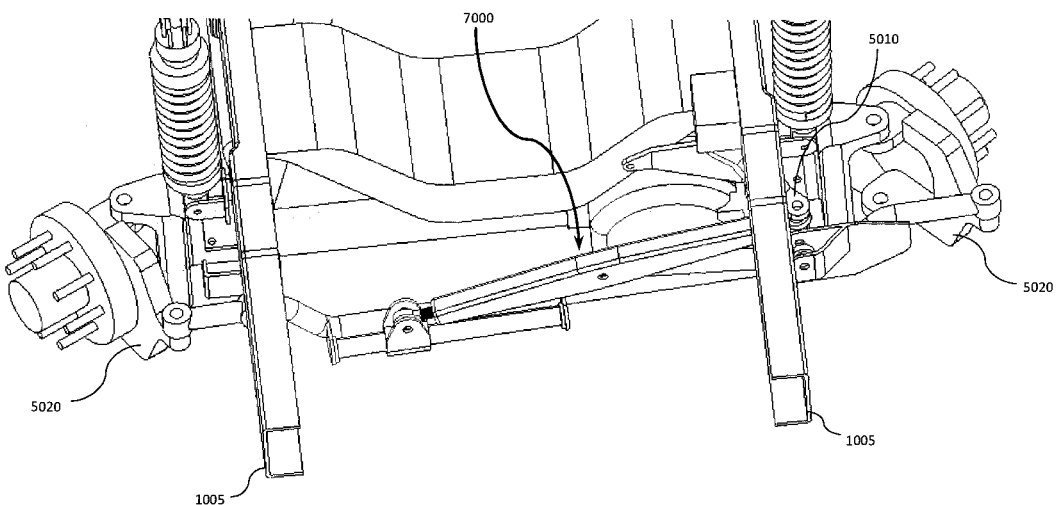
FIG. 16C depicts a perspective view of the steering system of the vehicle of FIGS. 8-16B after being steered to the left.

FIGS. 16A through 16C illustrate the response of spindles 5020 when the pitman arm 5010 is centered (shown in FIG. 16A), translated to the right of the vehicle (shown in FIG. 16B), and translated to the left of the vehicle (shown in FIG. 16C). The illustrated response may be similar to that of a properly aligned drag link 505 as illustrated in FIGS. 5A through 5C. In other words, the steering linkage 7000 may provide for the same turning radius as the drag link 505 and operates within the available space envelope.

Figure 17A:
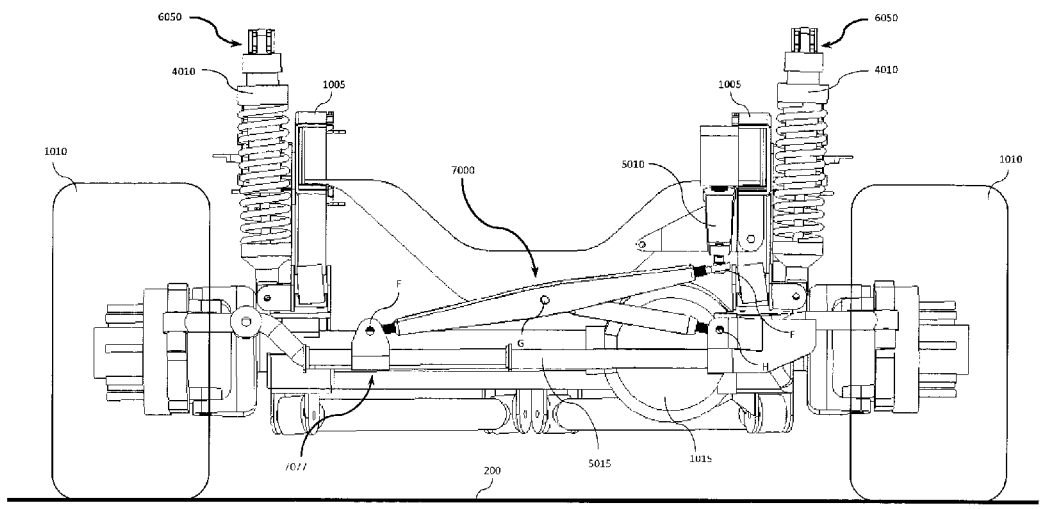
FIG. 17A depicts a front view of the steering system of the vehicle of FIGS. 8-16C in a lowered position in accordance with one embodiment.
Figure 17B:
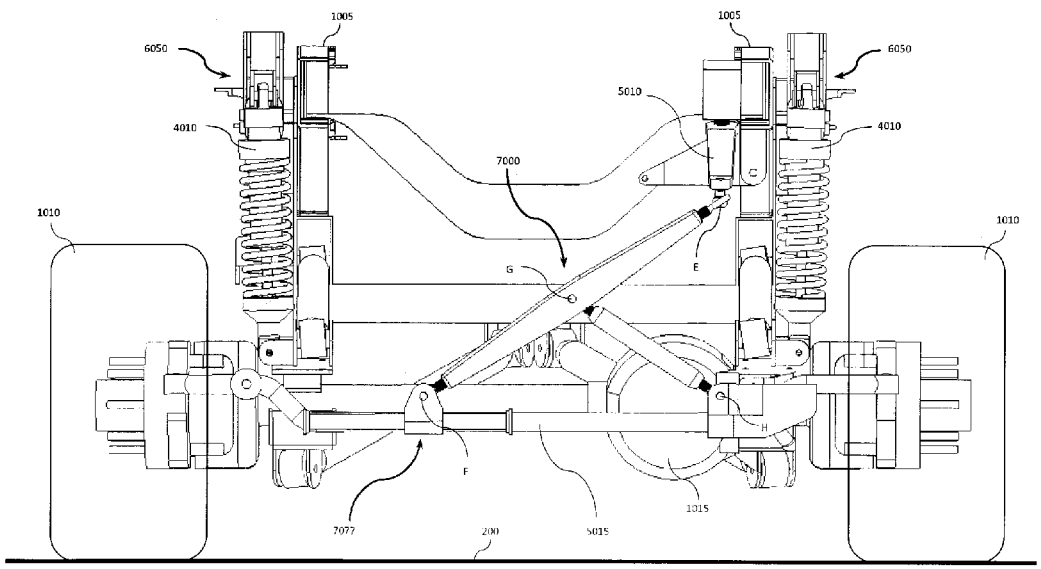
FIG. 17B depicts a front view of the steering system of the vehicle of FIGS. 8-17A in a raised position in accordance with one embodiment.

FIGS. 17A and 17B illustrate the response of the steering linkage 7000 as the frame 1005 travels vertically relative to the surface 200, i.e. as a result of bumps in the surface 200 or an increase to the vehicle ride height H. As the frame 1005 moves up or down, the second steering location F translates horizontally and the first steering location E and the fourth steering location H travel vertically along a straight line. The response of the steering linkage 7000 as illustrated in FIGS. 17A and 17B prevents "bump steer", and allows for changes in the vehicle ride height without a need for realignment of the pitman arm 5010.

Although a preferred system for allowing the ride height H to be adjusted is described, use of the adjustable suspension mount 6050 need not require the use of the steering linkage 7000 to achieve a vehicle with a significantly adjustable ride height. Other steering system art could be used in conjunction with the adjustable suspension mount 6050 in lieu of the steering linkage 7000 as described, e.g. rack and pinion, hydraulic ram, etc. Furthermore, the adjustable suspension mount 6050 need not only be used in conjunction with a straight axle 1015, or the means for controlling the straight axle 1015 positioning as described herein. The adjustable suspension mount 6050 could be used in conjunction with an independent suspension or other art used to control the position of the wheel 1010 relative to the frame 1005.

Use of the steering linkage 7000 need not be limited to a vehicle 1000 having an adjustable ride height system. The steering linkage 7000 can be used in lieu of the traditional drag link 505 on a vehicle having a fixed ride height and still function to eliminate "bump steer".

Still further, the components of the present disclosure may be provided in a kit in one embodiment. This kit may be purchasable by a consumer and installed in a vehicle as a replacement to the suspension and steering systems in the vehicle which may, prior to the installation, be similar to the prior art vehicle described hereinabove in FIGS. 1-7. The kit (not shown) may include one or more mount brackets 6060 attachable to the frame of a vehicle. The kit may further include at least one first mount link 6055 pivotally attachable to the mount bracket 6060 or other mount feature that is attachable to or integrated into the frame of a vehicle, and extendable to a device that supports the sprung weight of the vehicle and/or wheel and/or provides dampening. The first mount link 6055 may be pivotally attachable to the coilover, spring, shock, and/or airspring. The kit may further include at least one second mount link 6065 that is pivotally attachable to at least one of the mount bracket 6060 or mount feature and a second mount feature. The second mount link 6065 may be extendable to the first mount link 6055. At least one of the second mount link 6065 and the first mount link 6060 may be telescopic in nature. The second mount link 6065 may be pivotally attachable to the first mount link 6055. Further, the adjustable suspension kit may be configured to raise or lower a wheel with respect to the frame of a vehicle when the mount bracket 6060, the first mount link 6055 and the second mount link 6065 are installed on the vehicle and when the length of the first mount link 6055 or second mount link 6060 is altered. Alternately and/or additionally, the kit may include a third mount link (not shown) to replace either the first or second mount link 6055, 6060. The third mount link may be larger or smaller than the link it is configured to replace in order to raise or lower the suspension system when the third mount link is installed. It should be understood that the kit may provide one mount bracket 6060 and first mount link 6055 for each wheel, and one or more second mount links 6065 for each wheel.

The kit may further include at least one frame link mount 4020 attachable to the frame of a vehicle. At least one first frame link 4015 may be provided which may be pivotally attachable to the frame link mount 4020 and extendable to a straight axle of the vehicle that extends between two wheels, the first frame link 4015 may be pivotally attachable to the straight axle. Further included may be at least one second frame link 4015 pivotally attachable to at least one of the frame link mount 4020 and a second frame link mount (not shown). The second frame link 4015 may be configured to extend to the straight axle. The second frame link 4015 may be pivotally attachable to the straight axle. The kit may include four of the frame link mounts 4020, and four of each of the first frame links 4015 and second frame links 4015. The first and second frame links may actually be the exact same components. Thus, eight of the same links may be provided. In one embodiment, there may be two different sets of frame link mounts 4020: front frame link mounts and rear frame link mounts. In other words, the front frame link mounts may be dimensioned differently than the rear frame link mounts. Similarly, there may be four different types of frame links 4015: front top frame links, front bottom frame links, rear top frame links and rear bottom frame links. Thus, a kit may include two front top frame links, two front bottom frame links, two rear top frame links, and two rear bottom frame links.

The adjustable suspension kit may further include a straight axle 1015 attachable to and extendable between a first wheel and a second wheel of a vehicle. In other embodiments, a stock straight axle may be modified to incorporate the sliding joint 6077 or the sliding joint 6077 may simply be adapted to be attached to the stock straight axle. The adjustable suspension kit may further include a sliding joint 6077, where the straight axle 1015 includes a length that is adapted for slidable movement of the sliding joint 6077 when the sliding joint 6077 is attached to the length. A first panhard link 6075 may be attachable to and extendable between a first panhard location that is on or connected directly to the frame of the vehicle and the sliding joint 6077 at a second panhard location. The kit may include a second panhard link 6080 attachable to and extendable between a third panhard location that is on or connected directly to the middle of the first panhard link 6075 and a fourth panhard location that is on or connected directly to the straight axle 1015. The middle of the first panhard link 6075 may be located between the first panhard location and the second panhard location.

The adjustable suspension kit may still further include a steering tie bar 5015 attachable to and extendable between a first spindle and a second spindle of a vehicle. The kit may include another sliding joint 7077. The steering tie bar 5015 may include a length that is adapted for slidable movement of the sliding joint 7077 when the sliding joint 7077 is attached to the length. Further included may be a first steering link 7005 attachable to and extendable between a first steering location that is on or connected directly to a pitman arm of the vehicle and the sliding joint 7077 at a second steering location. The kit may include a second steering link 7010 attachable to and extendable between a third steering location that is on or connected directly to a middle of the first steering link 7005 and a fourth steering location that is on or connected directly to the steering tie bar 5015. The middle of the first steering link 7005 may be located between the first steering location and the second steering location.

It should further be understood that the above described kit may contain some, any, or all of the components described hereinabove. Further, the kit may include a control system for controlling the telescopic nature of at least one of the first mount link 6055 and the second mount link 6065. At least one of the first mount link 6055 and second mount link 6065 may be expandable or contractible via hydraulic power, in one embodiment.

In still another embodiment, a method is contemplated. The method may include providing some or all of the component parts listed hereinabove. The method may further include attaching a first mount link to a mount feature and extending the first mount link to a device used to support a load on a first wheel. The method may include pivoting the first mount link about the device and the mount feature. The mount feature may be attached to or integrated into the frame of the vehicle. The method may further include attaching a second mount link to at least one of the mount feature and a second mount feature and extending the second mount link to the first mount link and attaching the second mount link to the first mount link. The method may include pivoting the second mount link about the mount feature or second mount feature, and pivoting the second mount link about the first mount link. The method may further include extending, expanding or telescoping at least one of the first mount link and the second mount link.

Further, a method may include providing the above-described straight axle, first panhard link, and second panhard link and attaching one or more of these elements in the manner described hereinabove. The method may include attaching the first panhard link to a frame of the vehicle at a first location and to the straight axle at a second location. The method may include pivoting the first panhard link about the frame and the straight axle. The method may further include attaching the second panhard link to a middle point of the first panhard link and the straight axle. The method may include pivoting the second panhard link about the straight axle and the first panhard link. The method may further include sliding an end of the first panhard link along a length of the straight axle. This may be accomplished with a sliding joint.

Still further, a method may include providing the above-described steering tie bar, joint that is adaptable for movement in a direction that the steering tie bar extends, first steering link, and second steering link and attaching one or more of these elements in the manner described hereinabove. The method may include attaching the first steering link to a pitman arm of the vehicle at a first location and to the steering tie bar at a second location. The method may include pivoting the first steering link about the steering tie bar and the pitman arm. The method may further include attaching the second steering link to a middle point of the first steering link and the steering tie bar. The method may include pivoting the second steering link about the steering tie bar and the first steering link. The method may further include sliding or otherwise moving an end of the first steering link in a direction that the steering tie bar extends. This may be accomplished with a sliding joint, an arm joint or a rod joint.

Moreover, the method may include raising or lowering the suspension of a vehicle with the above described components. The method may include retaining the axle in a substantially similar horizontal position with respect to the wheels when the ride height is raised by at least 10 inches or more. The method may include retaining the steering alignment of the pitman arm in a neutral position when the ride height is raised by at least 10 inches or more.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A vehicle comprising:
   at least two wheels, a frame; and
   an adjustable suspension mount linkage including:
   a first mount link pivotally attached to a mount feature and extending to a device used to support a load on a first wheel, the first mount link pivotally attached to the device, wherein the mount feature is attached to or integrated into the frame of the vehicle; and
   a second mount link pivotally attached to at least one of the mount feature and a second mount feature, the second mount link extending to the first mount link, the second mount link pivotally attached to the first mount link;
   wherein the first mount link and the second mount link rotate between a raised position and a lowered position, wherein the frame is raised relative to the device in the raised position relative to the lowered position, and wherein the device remains vertical relative to the frame in each of the raised position and the lowered position, wherein at least one of the first mount link and the second mount link is telescopic.

2. The vehicle of claim 1, further comprising a wheel positioning arrangement including:
   a frame link mount attached or integral to the frame of the vehicle;
   an axle link mount attached or integral to a straight axle, the straight axle extending between two wheels of the vehicle;
   a first frame link pivotally attached to the frame link mount and extending to the axle link mount, the first frame link attached to the axle link mount; and
   a second frame link pivotally attached to at least one of the frame link mount and a second frame link mount, the second frame link extending to the axle link mount, the second frame link attached to the straight axle.

3. The vehicle of claim 1, wherein expansion of at least one of the first mount link and the second mount link is configured to raise or lower the device used to support the load on the wheel with respect to the frame.

4. The vehicle of claim 1, wherein replacement of at least one of the first mount link and the second mount link by a third mount link that has a different length than at least one of the first mount link and a second mount link is configured to raise or lower the device used to support the load on the wheel with respect to the frame.

5. The vehicle of claim 1, further comprising a second adjustable suspension mount linkage, a third adjustable suspension mount linkage, and a fourth adjustable suspension mount linkage, each of the second, third and fourth adjustable suspension mount linkages including the same components as the adjustable suspension mount linkage, wherein the second adjustable suspension mount linkage is attached to a device used to support the load on a second wheel, wherein the third adjustable suspension mount linkage is attached to a device used to support the load on a third wheel, and wherein the fourth adjustable suspension mount linkage is attached to a device used to support the load on a fourth wheel.

6. The vehicle of claim 1, wherein at least one of the first mount link and second mount link includes a hydraulic cylinder, and wherein the hydraulic cylinder provides expansion and contraction of at least one of the first mount link and second mount link, the vehicle further comprising a control system for controlling at least one of the first mount link and a second mount link.

7. The vehicle of claim 1, wherein the second mount link is located below the first mount link.

8. The vehicle of claim 1, wherein the second mount link includes a hydraulic cylinder.

9. An adjustable suspension mount kit comprising:
   a first mount link pivotally attachable to a mount feature attachable to or integrated into a frame of a vehicle, the first mount link extendable to a device used to support a load on a first wheel, the first mount link pivotally attachable to the device; and
   a second mount link pivotally attachable to at least one of the mount feature and a second mount feature, the second mount link extendable to the first mount link, the second mount link pivotally attachable to the first mount link, wherein the adjustable suspension mount kit is configured to raise or lower a wheel with respect to the frame when the first mount link and the second mount link are installed on the vehicle and when at least one of the first mount link and the second mount link is expanded or replaced by a third mount link having a different length than at least one of the first mount link and the second mount link such that the device used to support a load on the wheel remains vertical relative to the frame when the wheel is raised and lowered with respect to the frame, wherein at least one of the first mount link and the second mount link is telescopic.

10. The adjustable suspension mount kit of claim 9, further comprising a wheel positioning kit including:

a frame link mount attachable to the frame of the vehicle;
an axle link mount attachable or integral to a straight axle, the straight axle configured to extend between two wheels of the vehicle;
a first frame link pivotally attachable to the frame link mount and extendable to the axle link mount, the first frame link attachable to the axle link mount; and
a second frame link pivotally attachable to at least one of the frame link mount and a second frame link mount, the second frame link extending to a second axle link mount, the second frame link attachable to the second axle link mount.

11. The adjustable suspension mount kit of claim 10, wherein the frame link mount is dimensioned to extend below the frame a distance such that as a ride height is increased by thirteen inches, a change to a wheelbase is three inches or less.

12. The adjustable suspension mount kit of claim 9, wherein at least one of the first mount link and second mount link includes a hydraulic cylinder, and wherein the hydraulic cylinder provides expansion and contraction of at least one of the first mount link and second mount link, and wherein the adjustable suspension mount kit further includes a control system for controlling at least one of the first mount link and a second mount link.

13. The adjustable suspension mount kit of claim 9, wherein the mount feature is a mount bracket that is attachable to the frame of the vehicle.

14. The adjustable suspension mount kit of claim 9, wherein the second mount link includes a hydraulic cylinder.

15. An adjustable suspension mount system comprising:
a first mount link pivotally attached to a mount feature and extending to a device used to support a load on a first wheel, the first mount link pivotally attached to the device, wherein the mount feature is attached to or integrated into a frame of a vehicle; and
a second mount link pivotally attached to at least one of the mount feature and a second mount feature, the second mount link extending to the first mount link, the second mount link pivotally attached to the first mount link;
wherein the first mount link and the second mount link rotate between a raised position and a lowered position, wherein the frame is raised relative to the device in the raised position relative to the lowered position, and wherein the device remains vertical relative to the frame in each of the raised position and the lowered position, wherein at least one of the first mount link and the second mount link is telescopic.

16. The adjustable suspension mount system of claim 15, further comprising a wheel positioning system including:
a frame link mount attached or integral to the frame of the vehicle;
an axle link mount attached or integral to a straight axle, the straight axle extending between two wheels of the vehicle;
a first frame link pivotally attached to the frame link mount and extending to the axle link mount, the first frame link attached to the axle link mount; and
a second frame link pivotally attached to at least one of the frame link mount and a second frame link mount, the second frame link extending to a second axle link mount, the second frame link attached to the second axle link mount.

17. The adjustable suspension mount system of claim 15, wherein expansion of at least one of the first mount link and the second mount link is configured to raise or lower the device used to support the load on the wheel with respect to the frame.

18. The adjustable suspension mount system of claim 15, wherein replacement of at least one of the first mount link and the second mount link by a third mount link that has a different length than at least one of the first mount link and a second mount link is configured to raise or lower the device used to support the load on the wheel with respect to the frame.

19. The adjustable suspension mount system of claim 15, further comprising a second adjustable suspension mount, a third adjustable suspension mount, and a fourth adjustable suspension mount, each of the second third and fourth adjustable suspension mounts including the same components as the first adjustable suspension mount, wherein the second adjustable suspension mount is attached to a device used to support the load on a second wheel, wherein the third adjustable suspension mount is attached to a device used to support the load on a third wheel, and wherein the fourth adjustable suspension mount is attached to a device used to support the load on a fourth wheel.

20. The adjustable suspension mount system of claim 15, wherein at least one of the first mount link and second mount link includes a hydraulic cylinder, and wherein the hydraulic cylinder provides expansion and contraction of at least one of the first mount link and second mount link, the adjustable suspension mount system further comprising a control system for controlling at least one of the first mount link and a second mount link.

21. The adjustable suspension mount system of claim 15, wherein the second mount link is located below the first mount link.

22. The adjustable suspension mount system of claim 15, wherein the second mount link includes a hydraulic cylinder.

* * * * *